United States Patent
Simpson et al.

(10) Patent No.: US 12,449,363 B2
(45) Date of Patent: Oct. 21, 2025

(54) FLUORESCENCE-DETECTED MID-INFRARED PHOTOTHERMAL MICROSCOPY

(71) Applicant: PURDUE RESEARCH FOUNDATION, West Lafayette, IN (US)

(72) Inventors: Garth Jason Simpson, West Lafayette, IN (US); Aleksandr Razumtcev, West Lafayette, IN (US); Minghe Li, West Lafayette, IN (US)

(73) Assignee: PURDUE RESEARCH FOUNDATION

( * ) Notice: Subject to any disclaimer, the term of this patent is extended or adjusted under 35 U.S.C. 154(b) by 194 days.

(21) Appl. No.: 18/286,320

(22) PCT Filed: Apr. 12, 2022

(86) PCT No.: PCT/US2022/024439
§ 371 (c)(1),
(2) Date: Oct. 10, 2023

(87) PCT Pub. No.: WO2022/221290
PCT Pub. Date: Oct. 20, 2022

(65) Prior Publication Data
US 2024/0328949 A1     Oct. 3, 2024

Related U.S. Application Data

(60) Provisional application No. 63/173,500, filed on Apr. 12, 2021.

(51) Int. Cl.
G01N 21/64     (2006.01)
G01N 21/35     (2014.01)
(Continued)

(52) U.S. Cl.
CPC ......... G01N 21/6458 (2013.01); G01N 21/35 (2013.01); G01N 21/636 (2013.01);
(Continued)

(58) Field of Classification Search
CPC ... G01N 21/6458; G01N 21/35; G01N 21/636
See application file for complete search history.

(56) References Cited

U.S. PATENT DOCUMENTS 12,130,186 B2 *  10/2024  Liang ................ G01J 5/80
2004/0085540 A1   5/2004  Lapotka
(Continued)

OTHER PUBLICATIONS

Dazzi, A.: et al., Local infrared microspectrnscopy with subwavelength spatial resolution with an atomic force microscope tip used as a photo1hermal sensor. Optics Letters 2005, 30 (18), 2388-2390.
(Continued)

*Primary Examiner* — Hugh Maupin
(74) *Attorney, Agent, or Firm* — MERCHANT & GOULD P.C.

(57) ABSTRACT

A method of selectively photothermally heating a sample in a fluorescence-detected mid-infrared photothermal microscopy is disclosed which includes energizing a sample with one or more modulated infrared (IR) beams sourced by a multichannel laser array, concurrently continuously illuminating the sample with a probe beam, thereby generating a fluorescence response signal, capturing the fluorescence response signal, processing the captured modulated fluorescence response signal into two IR absorption spectra corresponding to chemical properties of two components in the sample by scanning over each channel of the multichannel laser array, generating a binary mask associated with the two spectra, establishing a cost function based on the generated binary mask, optimizing the cost function by optimizing the binary mask, and selectively energizing channels of the
(Continued)

multichannel laser array based on the optimized binary mask thereby maximizing discrimination between the two components.

24 Claims, 12 Drawing Sheets

(51) Int. Cl.
    *G01N 21/63*     (2006.01)
    *G01N 21/17*     (2006.01)

(52) U.S. Cl.
    CPC ............... *G01N 2021/1731* (2013.01); *G01N 2021/3595* (2013.01); *G01N 2021/6439* (2013.01); *G01N 2201/06113* (2013.01)

(56) References Cited

U.S. PATENT DOCUMENTS

| | | | |
|---|---|---|---|
| 2007/0009382 A1 | 1/2007 | Bedingham | |
| 2007/0099204 A1* | 5/2007 | Alexandre | C12Q 1/686 435/6.15 |
| 2017/0017069 A1 | 1/2017 | Siegel | |
| 2018/0014734 A1 | 1/2018 | Rogers | |
| 2018/0088041 A1 | 3/2018 | Zhang | |
| 2019/0317012 A1* | 10/2019 | Furstenberg | G01N 21/1717 |
| 2020/0303900 A1 | 9/2020 | Yun | |
| 2021/0164894 A1* | 6/2021 | Prater | G01N 21/35 |
| 2022/0018773 A1 | 1/2022 | Prater | |
| 2023/0071896 A1* | 3/2023 | Liang | G01J 3/36 |

OTHER PUBLICATIONS

Dazzi, A.. et al., Theory of infrared nanospectroscopy by photothermal induced resonance. Journal of Applied Physics 2010, /07 (12).
Centrone, A., Infrared Imaging and Spectroscopy Beyond the Diffraction Limit. In Annual Review of Analytical Chemistry, vol. 8. Cooks) R. G.; Pemberton, J. E,, Eds. 2015; vol. 8, pp. 101-126.
Li, N et al.., Nanoscale Infrared, Thermal, and Mechanical Characterization of Telaprevir-Pollymer Miscibility in Amorphous Solid Dispersions Prepared by Solvent Evaporation. Molecular Pharmaceutics 2016, 13 (3), 1123-1136.
Zhang, D. et al., Depth-resolved mid-infrared photothermal imaging of living cells and organisms with submicrometer spatial resolution Su. Adv. 2016, 2 (9), 7.
Li et al., MidInfrared Phototherrnal Imaging of Aclive Pharmaceutical Ingredients at Submicrometer Spatial Resolution. Analytical Chemistry, 2017, 89 (9). 4863-4867.
Hawkes. J.B. et al., The Temperature Coefficient of the Refractive Index of Water, Journal of the Optical Society of America 1948, 38 (9), 804-806.
Tokeshi, M. et al.,, Determination of Subyoctomole Amounts of Nonfluorescent Molecules Using a Thermal Lens Microscope: Subsingle-Molecule Determination. Analytical Chemistry, 2001, 73 (9), 2112-2116.
Snook, R.D. et. al., Thermal lens spectrometry. A review. Analyst 1995, 120 (8), 2051-2068.
Wang, Z. et al., Spatial light interference microscopy (SLIMJ. Optics Express 2011, 19 (2). 1016-1026.
Kirn, T. et al., , White-light diffraction tomography of unlabelled live cells. Nature Photonics 2014, 8 (3), 256-263.
Park, Y. et al., Quantitative phase imaging in biomedicine. Nature Photonics, 2018, 12 (10), 578-589.
Zhang, D. et al., Bond-selective transient phase imaging via sensing of the infrared Photothermal effect Light-Sci Appl. 2019, 8, 12.
Adhikari. S et al., Photo!hermal Microscopy. Imaging the Optical Absolption of Single Nanopartides and Single Molecules ACS Nano 2020 14 (12), 16414-16445.
Wang. X. D .et al. Luminescent probes and sensors for temperature. Chem. Soc. Rei•. 201.3, 42 (19), 7834-7869.
Wien.ken. C. J., Baaske, P.: Rothbauer. U.; Braun, D.; Duhr, S., Protein-binding assays in biological liquids using microscale thennophoresis.. Nature Communications 2010.
Jerab-Willemsen, M .. et al. Molecular Interaction Studies Using Microscale Thermophoresis. Assay and Drug Development Technologies 2011, 9 (4), 342-353.
Seidel. S. A. I. et al., Microscale Thermophoresis quantifies biomolecular interactions under previously challenging conditions. Methods 2013, 59 (3), 301-315.
Jerabek-Willemsen, M.; Andre. T.: Wanner, R., Ro!h. H. M.: Duhr. S.; Baaske. P.: Breitsprecher. D , MicroScale Thermophoresis Interaction analysis and beyond. Journal of Molecular Structure 2014, 1077, 101-113.
Kachlishvili, K. et al., Eliminating a Protein Folding Intermediate by Tuning a Local Hydrophobic Contact Journal of Physical Chemistry B 2017, 121 (15), 3276-3284.
Gelman, H.et al., ReAsH as a Quantitative Probe of In-Cell Protein Dynamics. Biochemistry 2016, 55 (13), 1968-1976.
Chen, T. et al., Pressure- and heat-induced protein unfolding in bacterial cells—crowding vs. sticking Febs Letters 2018, 592 (8), 1357-1365.
Prigozhin, M.B., Mapping fast protein folding with multiple-site fluorescent probes. Proc. Natl. Acad. Sci. U.S.A, 2015, 112 (26), 7966-7971.
Ross. D. et al., Temperature measurement in Microfluidic systems using a temperature-dependent fluorescent dye. Analytical Chemistry 2001, 73 (17), 4117-4123.
Liao. C. S et al., Portable broadband photoacoustic spectroscopy for trace gas detection by quantl1m cascade laser am1y s. Optics Let/erc1 2020, 45 (12).
Rehrauer, O.G. et al., Binary Complementary Filters for Compressive Raman Spectroscopy Applied Spectroscopy. 2018, 72 (1). 69-78.
Saboo S et al., Patterns of drug release as a function of drug loading from amorphous solid dispersions—A comparison of five different polymers Eur. J. Pharrn. Sci. 2020, 155, 15.
Indulkar, A. S. et al., Insights into the Dissolution Mechanism of Ritonavir-Copovidone Amorphous Solid Dispersions: Importance of Congruent Release for Enhanced Performance. Molecular Pharmaceutics 2019, 16 (3) 1327-1339.
Li, N. et. al., Water-Induced Phase Separation of Spray-Dried Amorphous Solid Dispersions. Molecular Pharmaceutics 2020, 17 (10). 4004-4017.
Toth. S. J et al., Selective Imaging of Active Pharmaceutical Ingredients in Powdered Blends with Common Excipients Utilizing Two-Photon Excited Ultraviolet Fluorescence and Ultraviolet-Second Order Nonlinear Optical Imaging of Chiral Crystals, Analytical Chemistry, 2012, 84 (14); 5869-5875.
Geiger, A. C. et al., Anomalous Diffusion Characterization by Fourier Transform-FRAP with Patterned Illuminalion. Biophys. J. 2020, 119 (4), 737-748.
Achanta et al., SLIC Superpixels Compared to State-of-theart Superpixel Methods, IEEE Transactions on Pattern Analysis and Machine Intelligence 2012, 34 (2274).
Madden et al., Two-Photon Excited UVFluorescence for Protein Crystal Detection, Acta Cryst. D 2011, 67, 839-846.
International Search Report and Written Opinion, Application No. PCT/US2022/024439, mailed Jul. 27, 2022, 1 page.

\* cited by examiner

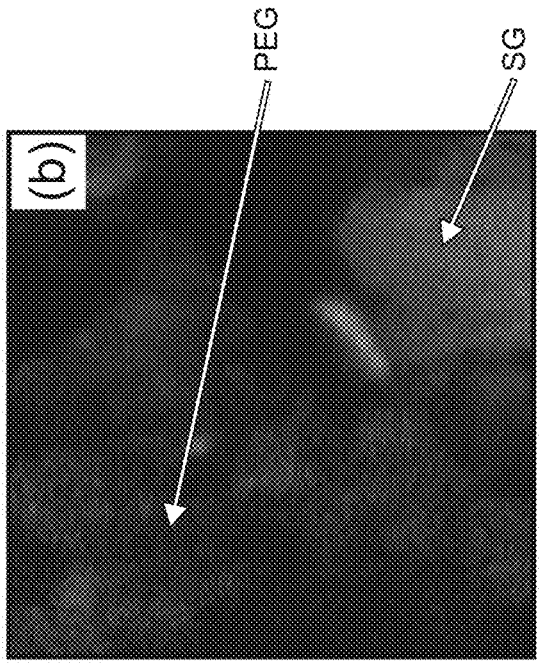
FIG. 4A
FIG. 4B
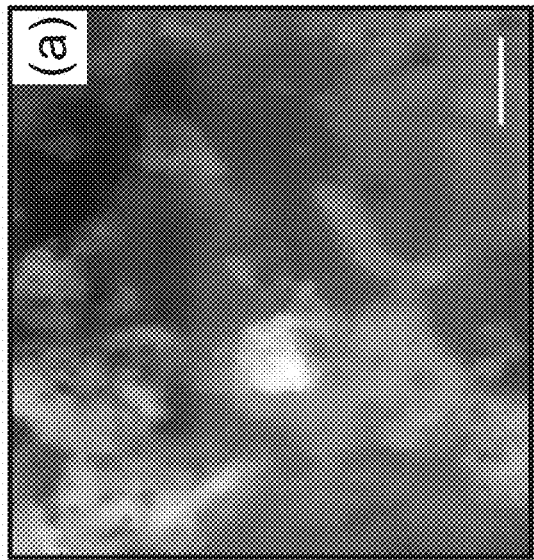
FIG. 4C
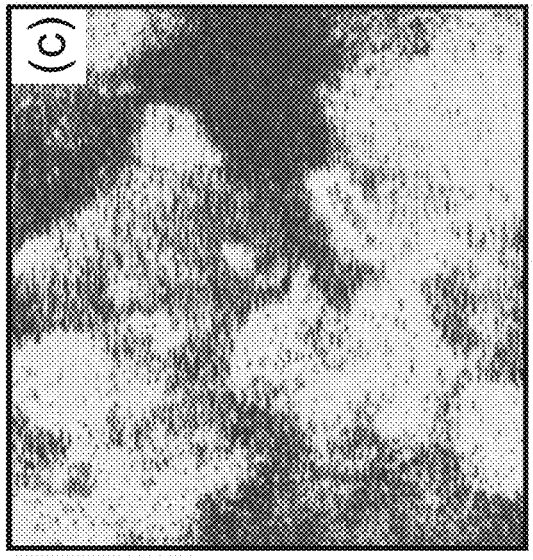
FIG. 4D

FLUORESCENCE-DETECTED MID-INFRARED PHOTOTHERMAL MICROSCOPY

CROSS-REFERENCE TO RELATED APPLICATIONS

This application is a U.S. National Phase Entry of PCT Application No.: PCT/US2022/024439, filed Apr. 12, 2022, which claims priority to U.S. Provisional Application No. 63/173,500, filed Apr. 12, 2021, the contents of which are hereby incorporated by reference in its entirety into the present disclosure.

STATEMENT REGARDING GOVERNMENT FUNDING

This invention was made with government support under CHE 2004046 awarded by the National Science Foundation; and under IIP-1916691 awarded by the National Science Foundation. The government has certain rights in the invention.

TECHNICAL FIELD

The present disclosure relates to systems and methods utilized for optically analyzing materials, and in particular to systems and methods for optically analyzing materials with fluorescence-detected mid-infrared photothermal microscopy.

BACKGROUND

This section introduces aspects that may help facilitate a better understanding of the disclosure. Accordingly, these statements are to be read in this light and are not to be understood as admissions about what is or is not prior art.

Photothermal infrared microscopy has recently emerged as a powerful tool for high-resolution optical imaging, with numerous advantages relative to alternative methods for pharmaceutical materials analysis. Photothermal microscopy with a spatial resolution on the order of a few nm has been realized by photothermal atomic force microscopy infrared spectroscopy (AFM-IR), in which heat-induced perturbation to an atomic force microscope tip informs on surface absorption. Photothermal AFM-IR is now a mature technology, routinely capable of providing mid-infrared microspectroscopy with nm-scale spatial resolution, with growing use in analysis of pharmaceutically relevant materials. However, it suffers from two key limitations; i) similar to most scanning probe microscopy methods, the mechanical response time of the cantilever sets a practical speed limit on pixel and frame rates, often requiring several minutes for a single image, and ii) by design, it intrinsically can only inform on absorption in the region immediately adjacent to the surface.

Several of the limitations of photothermal AFM-IR can be overcome by using light to transduce the photothermal temperature change. In optically detected photothermal infrared (O-PTIR), subtle changes in refractive index induced by local temperature changes from absorption of an IR beam are recorded through perturbation of a co- or counter-propagating visible beam. For pharmaceutical materials analysis, O-PTIR has been used in the prior art in an epi-detection configuration compatible with analysis of powders and opaque solid-state materials. In brief, a mid-infrared beam from a quantum cascade laser (QCL) was co-propagated with a 785 nm visible beam using a reflective Cassegrain objective. IR-induced modulation in the back-scattered visible light was detected using a polarizing beam-splitting cube, exploiting depolarization by the highly turbid solid-state samples. IR-modulated changes in the backscattering enabled spectral assignment of active and inactive ingredients in a Tylenol tablet.

Despite these successes, O-PTIR measured by perturbation of a probe beam suffers from several limitations, exacerbated in analysis of pharmaceutical materials. First, refractive index is a fairly weak function of temperature, changing by about 0.01% per° C. for water at room temperature. Second, it is well known that the photothermally induced deflection of a probe beam in transmission approaches zero for a point source centered in the probe beam focus and is maximized with an axial offset between the probe beam and photothermal lens of $\sqrt{3}Z_0$ (where, $Z_0$ is the Rayleigh range, equal to half the depth of focus). As such, an O-PTIR measurement of a point source along the optical axis based on detection of beam deflection is only expected to produce peak signals in homogeneous media when the probe beam focus is displaced by nearly a full depth of field relative to the photothermal source, potentially producing nontrivial 3D point spread functions.

For measurements of transparent samples acquired in transmission, this limitation can be overcome by coupling O-PTIR with quantitative phase contrast approaches, enabling photothermal contrast through interferometry rather than beam deflection. Dual-path interferometric approaches have also been shown to enable sensitive photothermal visible-wavelength absorption spectroscopy of particles in solution, approaching single molecule sensitivity. However, many pharmaceutical materials exhibit significant turbidity and heterogeneity, creating challenges for analytically modeling and interpreting photothermal changes in back-scattered intensity from chemically and physically heterogeneous samples. In many instances, the optical constants associated with temperature change are not known, complicating quantitative interpretation of the magnitude of O-PTIR responses. Furthermore, the detected back-scattered signal can depend on both depolarization and scattering in ways that may depend nontrivially on the particle size distribution within compacted or powdered samples.

Another aspect of photothermal microscopy with infrared excitation is fluorescent enhanced spectroscopy. An example of fluorescent enhanced photothermal infrared spectroscopy is provided in US Pub. application Ser. No. 20220018773 for Prater in which a system and method are disclosed which enable spatial resolution measurements of IR absorption with simultaneous confocal fluorescence imaging in which simultaneous detection of both IR absorption and confocal fluorescence using the same optical detector at the same time is presented. In Prater's work, IR and other optical signals (probe beam) are combined either through a beam combiner (i.e., the IR and the probe beam are incident onto the sample from the same side of the sample) or the IR is passed through a sample and thus the IR and the probe beam are incident onto the sample from opposite sides of the sample.

However, the system and method disclosed in Prater's work suffers from being able to effectively distinguish between two materials in a sample tray where the IR characteristics of these two materials are similar. This inability to distinguish between two optically similar materials presents a significant challenge to the entire endeavor of fluorescence enhanced photothermal infrared spectroscopy.

Therefore, there is an unmet need for a novel fluorescent-detected photothermal infrared spectroscopy method and system that based on a non-destructive manner can provide μm-scale spatial resolution map of a surface with significant turbidity and heterogeneity and which provides improved discrimination for materials with similar IR signatures.

SUMMARY

A method of selectively photothermally heating a sample in a fluorescence-detected mid-infrared photothermal microscopy in order to discriminate between two components in a sample is disclosed. The method includes energizing a sample with one or more modulated infrared (IR) beams sourced by a multichannel laser array, concurrently continuously illuminating the sample with a probe beam, thereby generating a fluorescence response signal, whereby the multichannel laser output is modulated thereby modulating the heating at a predetermined frequency, thereby modulating the fluorescence response signal, capturing the fluorescence response signal, processing the captured modulated fluorescence response signal into two IR absorption spectra corresponding to chemical properties of two components in the sample by scanning over each channel of the multichannel laser array, generating a binary mask associated with the two spectra, establishing a cost function based on the generated binary mask, optimizing the cost function by optimizing the binary mask, and selectively energizing channels of the multichannel laser array based on the optimized binary mask thereby maximizing discrimination between the two components.

In the aforementioned method each channel of the multichannel laser array is associated with a unique wavelength.

In the aforementioned method the sample is capable of autofluorescence.

In the aforementioned method the sample includes one or more fluorescence labels.

In the aforementioned method the binary mask is a concatenation of a first primary mask and a second primary mask corresponding to the two IR absorption spectra.

In the aforementioned method the first primary mask and the second primary mask are expressed by a 1×n matrix, where the first primary mask is the binary complement of the second primary mask, and where n is number of channels of the multichannel laser array, wherein the binary mask is thus expressed by a 2×n matrix.

In the aforementioned method the first primary mask is corresponding to a difference of normalized spectra of the two IR absorption spectra.

In the aforementioned method the normalization of each spectrum of the two IR absorption spectra is based on dividing absorption in each spectrum by the maximum absorption value in the associated spectrum.

In the aforementioned method each of the normalized spectra is expressed as a n×1 matrix.

In the aforementioned method the cost function is based on a matrix multiplication of the binary mask with a concatenated normalized spectra matrix, wherein the concatenated normalized spectra matrix is a concatenation of the two normalized spectra matrixes, wherein the concatenated normalized spectra matrix is expressed as a 2×n matrix, wherein the cost function is thus expressed as a 2×2 matrix.

In the aforementioned method the optimization of the cost function is based on iterative minimization of a ratio of addition of diagonal components of the cost function matrix, where the iteration includes n runs through a loop, wherein in each loop run (i) the ith bit of each of the first and the second primary masks are temporarily flipped and the ratio of addition of diagonal components are temporarily calculated, and wherein if the temporary ratio of addition of diagonal components is less than the ratio of addition of diagonal components associated with a prior run of the loop, then temporary first and the second primary masks are assigned as first and the second primary masks and the temporary value of the ratio of addition of diagonal components is assigned as the ratio of addition of diagonal components.

In the aforementioned method the optimized cost function generates a first finalized mask and a second finalized mask, each of the first finalized mask and the second finalized mask provide patterns for a first and second activation of the multichannel laser array, correspondingly.

A fluorescence-detected mid-infrared photothermal microscopy system capable of discriminating between two components in a sample is also disclosed. The system includes a multichannel laser array configured to energize a sample with one or more modulated infrared (IR) beams, a continuous laser source configured to provide concurrent and continuous illumination of the sample with a probe beam, thereby generating a fluorescence response signal, whereby the multichannel laser output is modulated thereby modulating the heating at a predetermined frequency, thereby modulating the fluorescence response signal, a photomultiplier tube configured to capture the fluorescence response signal, and a controller. The controller is configured to process the captured modulated fluorescence response signal into two IR absorption spectra corresponding to chemical properties of two components in the sample by scanning over each channel of the multichannel laser array, generate a binary mask associated with the two spectra, establish a cost function based on the generated binary mask, optimize the cost function by optimizing the binary mask, and selectively energize channels of the multichannel laser array based on the optimized binary mask thereby maximizing discrimination between the two components.

In the aforementioned system each channel of the multichannel laser array is associated with a unique wavelength.

In the aforementioned system the sample is capable of autofluorescence.

In the aforementioned system the sample includes one or more fluorescence labels.

In the aforementioned system the binary mask is a concatenation of a first primary mask and a second primary mask corresponding to the two IR absorption spectra.

In the aforementioned system the first primary mask and the second primary mask are expressed by a 1×n matrix, where the first primary mask is the binary complement of the second primary mask, and where n is number of channels of the multichannel laser array, wherein the binary mask is thus expressed by a 2×n matrix.

The system of claim 18, wherein the first primary mask is corresponding to a difference of normalized spectra of the two IR absorption spectra.

In the aforementioned system the normalization of each spectrum of the two IR absorption spectra is based on dividing absorption in each spectrum by the maximum absorption value in the associated spectrum.

In the aforementioned system each of the normalized spectra is expressed as a n×1 matrix.

In the aforementioned system the cost function is based on a matrix multiplication of the binary mask with a concatenated normalized spectra matrix, wherein the concatenated normalized spectra matrix is a concatenation of the two normalized spectra matrixes, wherein the concatenated normalized spectra matrix is expressed as a 2×n matrix, wherein the cost function is thus expressed as a 2×2 matrix.

In the aforementioned system the optimization of the cost function is based on iterative minimization of a ratio of addition of diagonal components of the cost function matrix, where the iteration includes n runs through a loop, wherein in each loop run (i) the ith bit of each of the first and the second primary masks are temporarily flipped and the ratio of addition of diagonal components are temporarily calculated, and wherein if the temporary ratio of addition of diagonal components is less than the ratio of addition of diagonal components associated with a prior run of the loop, then temporary first and the second primary masks are assigned as first and the second primary masks and the temporary value of the ratio of addition of diagonal components is assigned as the ratio of addition of diagonal components.

In the aforementioned system the optimized cost function generates a first finalized mask and a second finalized mask, each of the first finalized mask and the second finalized mask provide patterns for a first and second activation of the multichannel laser array, correspondingly.

BRIEF DESCRIPTION OF DRAWINGS

FIGS. 4a-4e are results of microscopy measurements that spectroscopically discriminate between particles in a mixture of two powdered materials: PEG and hydrated silica gel, specifically, FIG. 4a provides the result of F-PTIR Microscopy of a mixture of silica gel (SG) and PEG particles for epi-fluorescence image of the field of view (FOV); FIGS. 4b, 4c, and 4d are similar results as in FIG. 4a for components map within the FOV (FIG. 4b), where red regions (identified) correspond to species identified as SG; blue regions (identified) correspond to PEG; and PEG and SG concentration maps after 10 nonnegative matrix factorization (NNMF) iterations are provided in FIGS. 4c and 4d, respectively; unprocessed F-PTIR spectra of silica gel and PEG are shown in FIG. 4e

FIGS. 5b-5d are example mid-IR absorption spectra (FIG. 5b is raw, FIG. 5c is normalized spectra, and FIG. 5d is the difference in normalized spectra) vs. QCL channel all provided as an example of the steps taken in the flowchart of FIG. 5a.

DETAILED DESCRIPTION

Figure 1A:
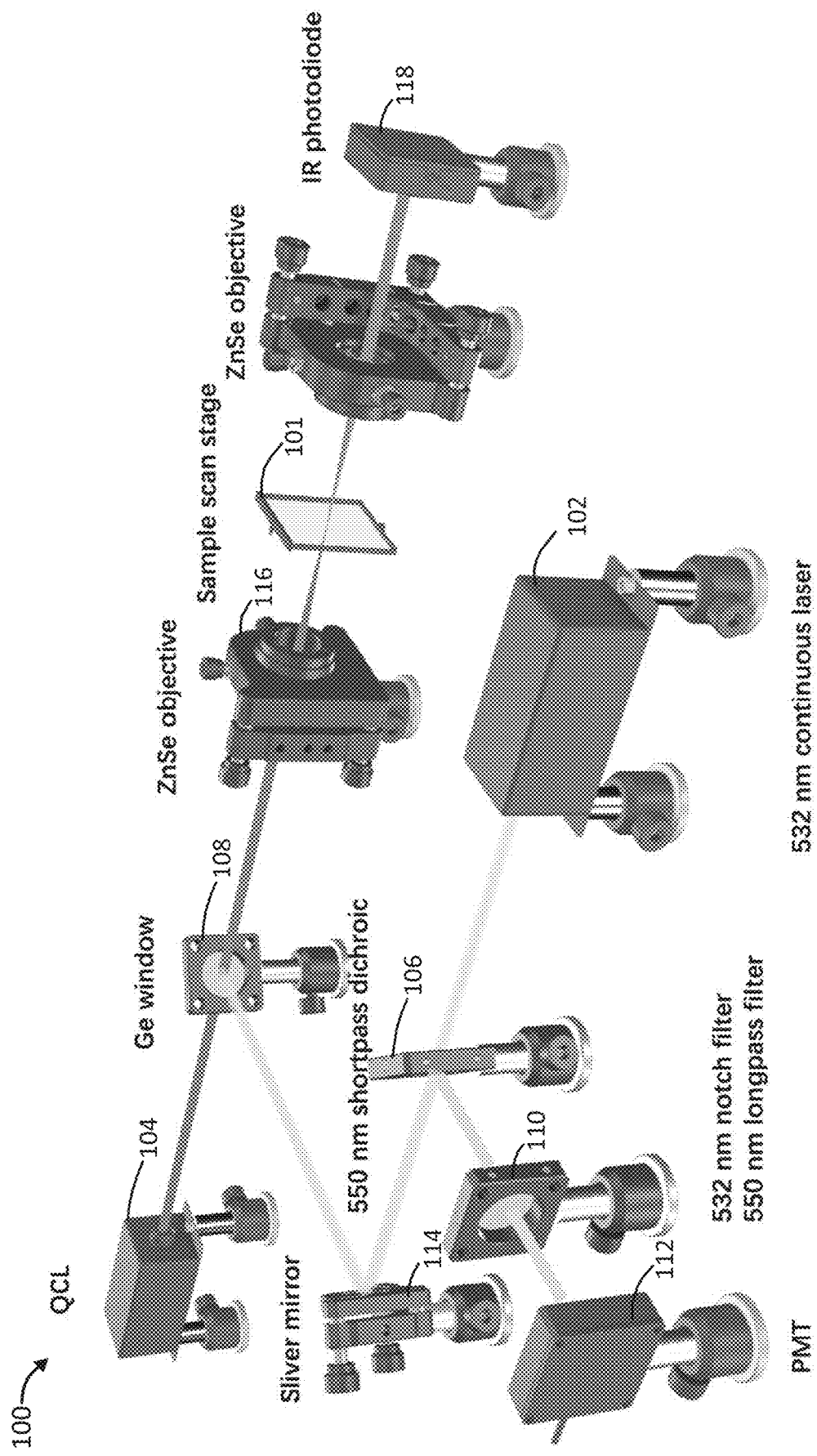
FIG. 1a is a schematic of a fluorescence-detected mid-infrared photothermal microscopy system according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure provides a novel fluorescent-detected photothermal infrared spectroscopy method and system that based on a non-destructive manner can provide µm-scale spatial resolution map of a surface with significant turbidity and heterogeneity and which provides improved discrimination for materials with similar IR signatures. Towards this end, use of fluorescence intensity to detect local changes in temperature induced by mid-infrared absorption is presented. Specifically, use of optical binary masks and non-negative matrix factorization along with application of an IR source supporting random-access rapid-fire delivery of multiple wavelengths to provide a multiplexed signal to noise advantage upon illumination with designed patterns of wavelengths for contrast discrimination optimization are provided.

As additional background information, the quantum efficiency of fluorescence varies sensitively with temperature. Following optical excitation, increases in temperature enable access to a greater suite of thermally accessible relaxation pathways, all of which compete with fluorescence for a net reduction in fluorescence intensity. Temperature-dependent changes occur in autofluorescence emission which can be used to target measurements of protein mobility and thermal stability. Temperature-dependence of both native autofluorescence and labeled fluorescence to recover timescales for protein dynamics in temperature-jump experiments have been already shown in the art. Compared to refractive index changes, the change in fluorescence quantum efficiency can be quite large, routinely changing by about 2-3%/° C. for tryptophan and about 1-2%/° C. for aqueous solutions of rhodamine B, corresponding to about 100-fold higher relative change than refractive index detection. Given the high signal to noise with which fluorescence measurements are regularly recorded, this sensitivity is more than sufficient to enable fluorescence detection of local temperature perturbations of <1° C. induced by mid-infrared absorption. Following initial proof-of-concept measurement supporting the viability of fluorescence-detected photothermal infrared (F-PTIR) microscopy, we demonstrate its utility in unambiguous observation of water-induced amorphous phase separation (AAPS) in amorphous solid dispersions of ritonavir in polyvinyl pyrrolidone/vinyl acetate (PVPVA), with direct implications in pharmaceutical materials design.

To increase the components assignment accuracy by increasing signal-to-noise ratio, unprocessed F-PTIR images of ritonavir (RTV)-Polyvinylpyrrolidone/vinyl acetate (PVPVA) samples were first divided into 27 larger regions (superpixels), and the subsequent analysis was done on superpixel-by-superpixel basis (compared to pixel-by-pixel analysis for the model silica gel-polyethylene glycol (PEG) system). The segmentation was done by using the superpixel oversegmentation approach described in Achanta et al. (SLIC Superpixels Compared to State-of-the-art Superpixel Methods, *IEEE Transactions on Pattern Analysis and Machine Intelligence* 2012, 34 (2274)). Then, the same approach as described in Madden et al. (Two-Photon Excited UV-Fluorescence for Protein Crystal Detection, *Acta Cryst. D* 2011, 67, 839-846) was applied to calculate the concentrations of components. Each superpixel was assigned to either ritonavir, PVPVA or background based on the empirically adjusted concentration threshold.

Referring to FIG. 1A, a schematic of the microscope system 100 according to the present disclosure is provided. Specifically, FIG. 1A is a schematic of an F-PTIR microscope configuration, with the mid-infrared QCL beam utilized to heat a sample, co-propagating with a 532 nm visible beam for fluorescence excitation. In this configuration, the QCL 104 provides infrared heating of a sample that is positioned on a sample scan stage 101 and the 532 nm visible laser 102 provides the source for fluorescence excitation of the sample (i.e., auto-fluorescence or florescence label). Thus, the F-PTIR microscope system 100 includes the continuous 532 nm green laser (SLOC LASERS) 102 co-propagating with the broadly-tunable quantum cascade laser (QCL) array (PENDAR TECHNOLOGIES) 104.

In the microscope system 100, two selective filters are provided: 1) a 550 nm shortpass dichroic mirror 106; and 2) a Ge window 108. Each of these selective filters 106 and 108 are configured to allow certain wavelengths through and block other wavelengths. For example, the 550 nm shortpass dichroic mirror 106 transmits light with a wavelength below 550 nm and reflects the light with a longer wavelength. Therefore, the 532 nm continuous beam travels through the 550 nm shortpass dichroic mirror 106 but wavelengths higher than 550 nm (e.g., fluorescent signals emitted from the sample disposed on the sample scan stage 101) are reflected. Similarly, the Ge window 108 is transparent for the QCL (i.e., transmits through) and reflects 532 light which is emitted from the sample disposed on the sample scan stage 101. The 532 nm continuous laser probe beam is passed through the 550 nm shortpass dichroic mirror 106, reflected off of the silver mirror 114, reflected off of the Ge window 108 and on to the sample disposed on the sample scan stage 101 through a zinc selenide (ZnSe) objective 116. At the same time, the QCL beam emanating from the QCL 104 passes through the Ge window 108 and through the ZnSe objective 116 and onto the sample. The fluorescence signal emanating from the sample propagates in all directions including back into the beam path. The back-propagating fluorescence signal is first reflected from the Ge window 108 onto the silver mirror 114 and it is reflected therefrom onto the 550 shortpass dichroic mirror 106, which is then reflected and passed through the 532 notch filter+550 longpass filter set 110 onto a photomultiplier tube (PMT) 112 configured in an epi-detected configuration. The purpose of the filter set 110 is also to reject any of the possible background light from the incident 532 nm probe beam. The visible and mid-IR lasers were focused to the sample plane through the ZnSe lens (f=25 mm, THORLABS) 116, calibrated using a clear pass USAF test grid (EDMUND OPTICS). Divergence of the beam from the QCL array 104 was adjusted to align the visible and infrared focal planes. Images were collected by sample scanning with a piezoelectric stage (MADCITYLABS NANO-BIO300). The PMT 112 (HAMAMATSU) was used to collect fluorescence signal from the sample in epi-configuration. Signal from the PMT 112 was passed through a tunable electronic band-pass filter (ITHACO M4302), FIG. 1B, centered at the modulation frequency of the QCL array 104. The frequency-filtered signal was then passed through a lock-in amplifier (STANFORD RESEARCH SR810), not shown. The amplified signal was then digitized by a digitizer (ALAZAR ATS9462), see FIG. 1B, with images generated using MATLAB software. For spectral acquisition, F-PTIR signals for each wavelength channel were normalized to the transmitted intensity in the absence of a sample measured using an IR-photodiode (VIGO SYSTEMS) 118.

The average power of the green laser was around 0.2 mW on the sample plane for rhodamine-6G (R6G) associated samples and 30 mW for samples associated with Nile red as the fluorescent reporter. The monolithic QCL array 104 included 32 independently addressable wavelength channels in the range of wavenumbers from 1190 $cm^{-1}$ to 1330 $cm^{-1}$. In typical operation, the QCL array 104 was operated in a burst mode, in which a rapid series of 300 ns laser pulses was sequentially activated firing every 8 us for "on" cycles ranging from 20 us to 250 μs, followed by quiescent "off" periods of equal duration, with an average power≤0.8 mW on the sample plane. Timing details are described in greater detail below and with reference to FIG. 2a in which the pulse train profile of the QCL array 104 is provided. The net duty cycle of the QCL array 104 in this mode was maintained at <2% overall in single wavelength mode and about 4-5% for multichannel operation.

Figure 1B:
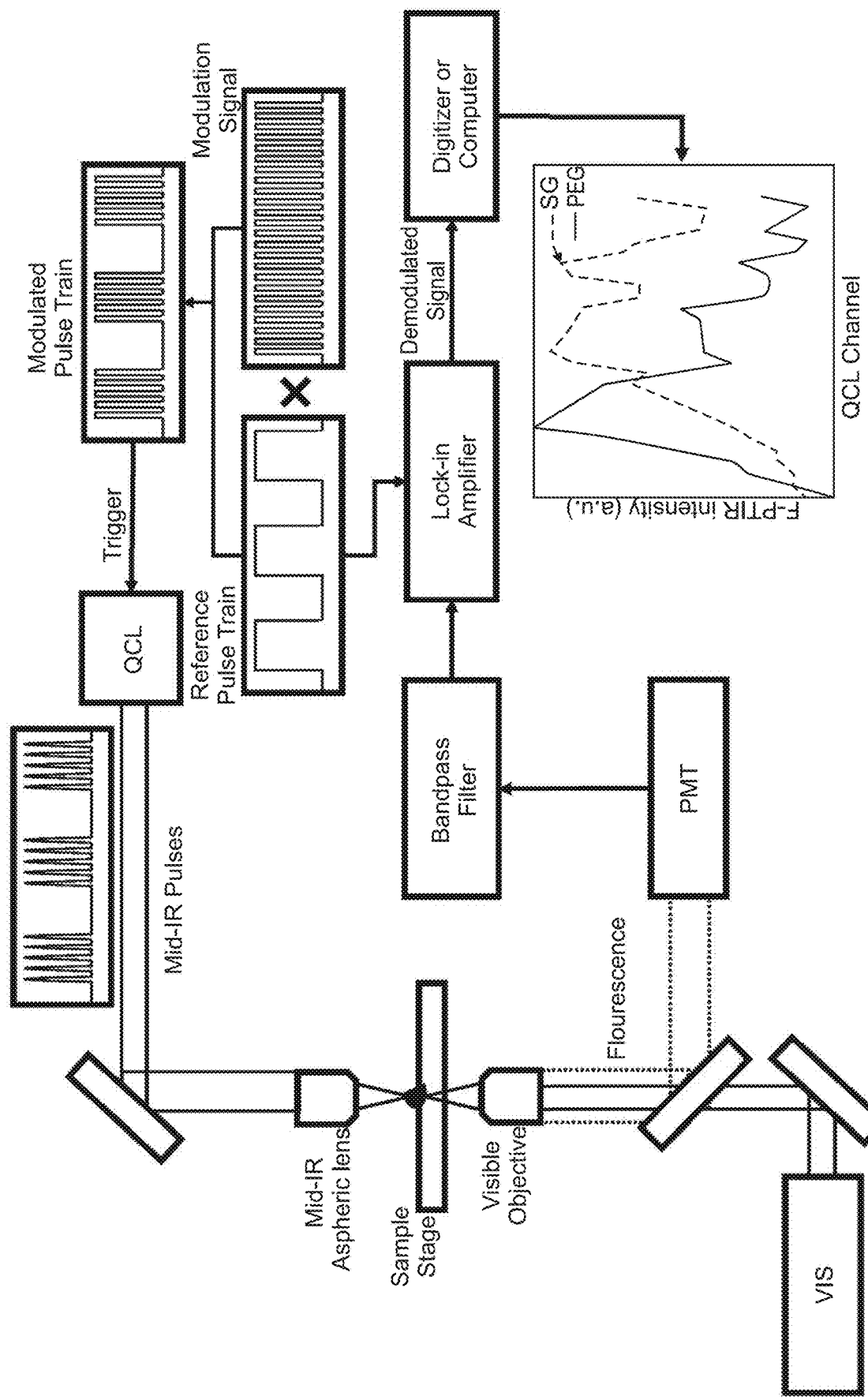
FIG. 1b is another schematic of a fluorescence-detected mid-infrared photothermal microscopy system according to the present disclosure.

Referring to FIG. 1B, the schematic shown in FIG. 1A is shown with additional details. As discussed in reference to FIG. 1A, a 532 nm visible beam for fluorescence excitation (identified as VIS) is reflected and passed through optical devices an onto the sample stage through a visible objective. At the same time the QCL is triggered by a pulse train, thus configured to generate a burst of mid-IR pulses with concurrent wavelengths of choice that are appropriate for energizing (i.e., heating) compounds with similar IR signatures on the sample stage. The mid-IR burst is reflected off of an optical element and thus configured to apply to the sample on the sample stage through a mid-IR aspheric lens. Fluorescence excitation travels back on the same path as the VIS beam but is reflected off the optical element that allows VIS beam to pass through. The reflection is provided to the photomultiplier tube (PMT). The signal from the PMT is provided to a bandpass filter. The bandpass filtered signal is provided to a lock-in amplifier whose output is a demodulated signal that is provided to an analog to digital converter and then provided to a controller. Based on apriori knowledge of potential compounds present on the sample stage, the QCL trigger signal is constructed by modulating a preference pulse train with a modulation signal, thus allowing the QCL to only be triggered based on a low duty cycle (e.g., about 5% to about 10%). The reference pulse train is also fed to the bandpass filter to inform the lock-in amplifier as to when the QCL is activated.

Table 1 provided below provides QCL spectral channels characteristics and modulated pulse train profile pf the QCL array 104.

TABLE 1

QCL spectral channels characteristics and modulated pulse train profile

| QCL Channel number | Spectral Peak(cm$^{-1}$) |
| --- | --- |
| 1 | 1339.34 |
| 2 | 1333.98 |
| 3 | 1328.67 |
| 4 | 1323.19 |
| 5 | 1318.01 |
| 6 | 1312.88 |
| 7 | 1306.01 |
| 8 | 1302.58 |
| 9 | 1297.21 |
| 10 | 1290.77 |
| 11 | 1285.76 |
| 12 | 1282.51 |
| 13 | 1277.21 |
| 14 | 1270.94 |
| 15 | 1267.50 |
| 16 | 1262.86 |
| 17 | 1257.80 |
| 18 | 1251.83 |
| 19 | 1248.52 |
| 20 | 1243.82 |
| 21 | 1239.12 |
| 22 | 1233.51 |
| 23 | 1230.20 |
| 24 | 1225.56 |
| 25 | 1220.92 |
| 26 | 1216.64 |
| 27 | 1212.24 |
| 28 | 1207.84 |
| 29 | 1202.30 |
| 30 | 1199.28 |
| 31 | 1195.00 |
| 32 | 1190.72 |

Figure 2A:
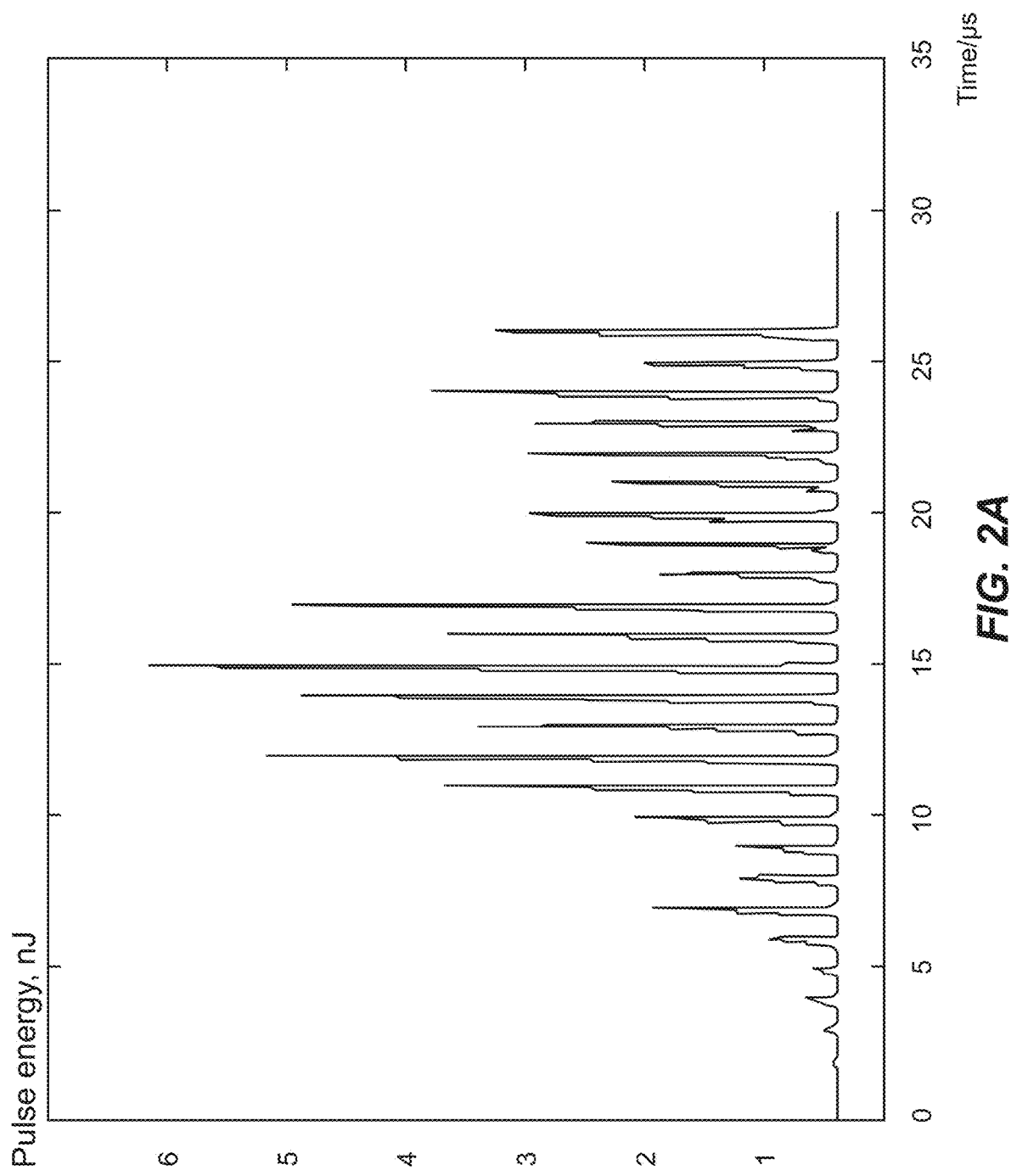
FIG. 2a is a graph of pulse energy in nJ vs. time in us depicting a pulse train of a multichannel laser array (QCL) as part of the system of the present disclosure.
Figure 2B:
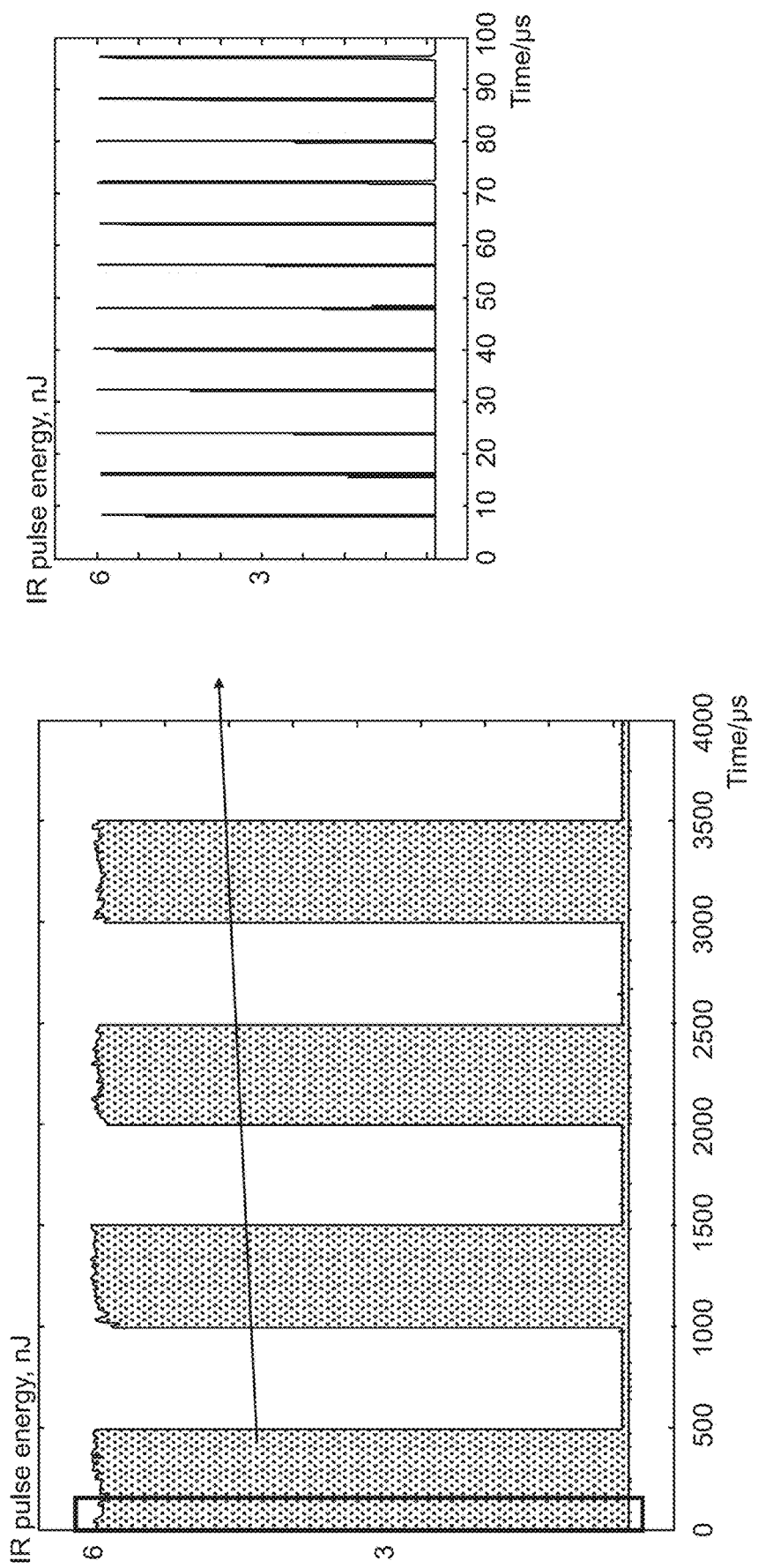
FIG. 2b is a graph of IR pulse energy in nJ vs. time in µs in which a portion is magnified for improved elucidation, in which a modulated QCL pulse train profile (single channel mode) is depicted in which one of the spectral channels is modulated at 1 kHz with 8 us delay between pulses.

QCL pulse train profile (in which all channels fired at 16.5 V with 0.5 µs delay, 300 ns pules are shown in FIG. 2a, which is a graph of pulse energy in nJ vs. time in µs. QCL channels 12-14 and 30 were not included in the pulse train, as they produced negligible power at the voltage setting used. Modulated QCL pulse train profile (single channel mode) are depicted in FIG. 2b in which spectral channel 18 is modulated at 1 kHz with 8 µs delay between pulses. FIG. 2b is a graph of IR pulse energy in nJ vs. time in us in which a portion is magnified for improved elucidation.

R6G-associated solutions of solvents were prepared by dissolving 10 mg of rhodamine-6G (SIGMA ALDRICH) in 10 mL of solvent [deionized water, dimethylformamide (DMF, SIGMA) and dimethyl sulfoxide (DMSO, Sigma)]. R6G-associated silica gel particles were prepared by mixing 100 mg of silica gel (60-200 µm particles, SILICYCLE) and 5 mg of R6G in 10 mL of deionized water and air drying the extracted particles extracted. R6G-associated polyethylene glycol (PEG) particles were prepared by air-drying a solution of 300 mg of PEG (SIGMA ALDRICH) and 10 mg of R6G in 10 mL of water, from which smaller particles were recovered by grinding. Thin films of ritonavir (RTV) associated polyvinyl pyrrolidone/vinyl acetate copolymer (PVP-VA) systems were prepared by spin-coating a stock solution of 300 mg/mL of 30% RTV (Sigma), 70% PVPVA (SIGMA) and 0.1% Nile Red (SIGMA) by weight in methanol. The films were left under vacuum overnight to remove residual solvent. Phase separation was induced by placing the thin films in the 100% relative humidity environment for 1 hour.

Figure 2D:
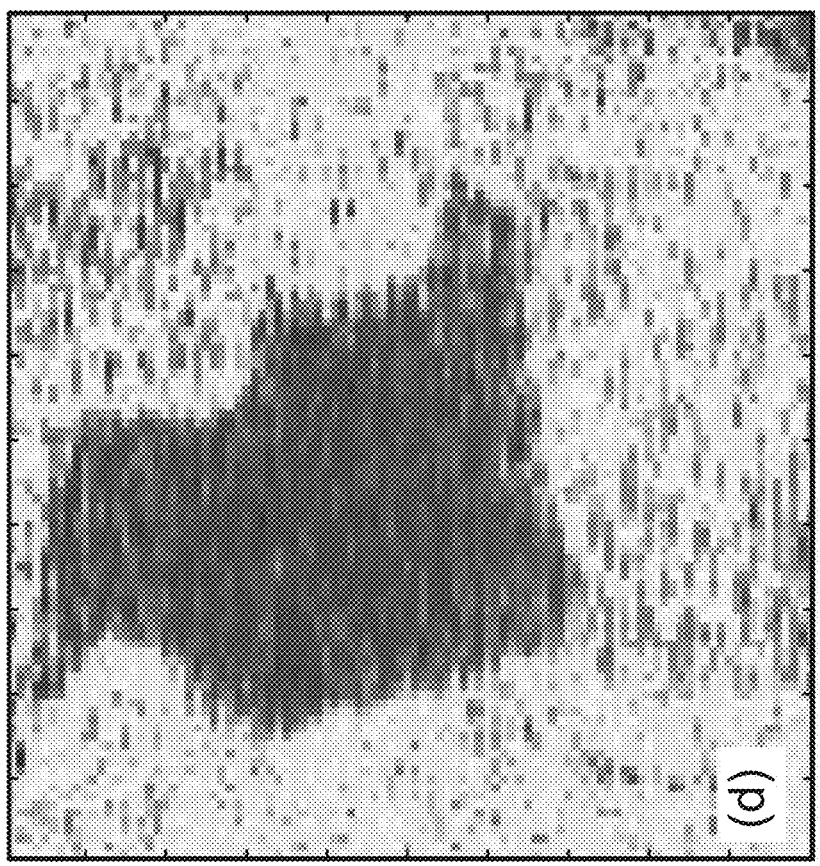
FIGS. 2c and 2d are fluorescence-detected photothermal infrared (F-PTIR) images of R6G-associated silica gel in which epi-fluorescence field-of-view for reference is provided in FIG. 2c and unprocessed F-PTIR image at 20 kHz modulation frequency, corresponding to a thermal diffusion length of 1.72 µm is provided in FIG. 2d.
Figure 2C:
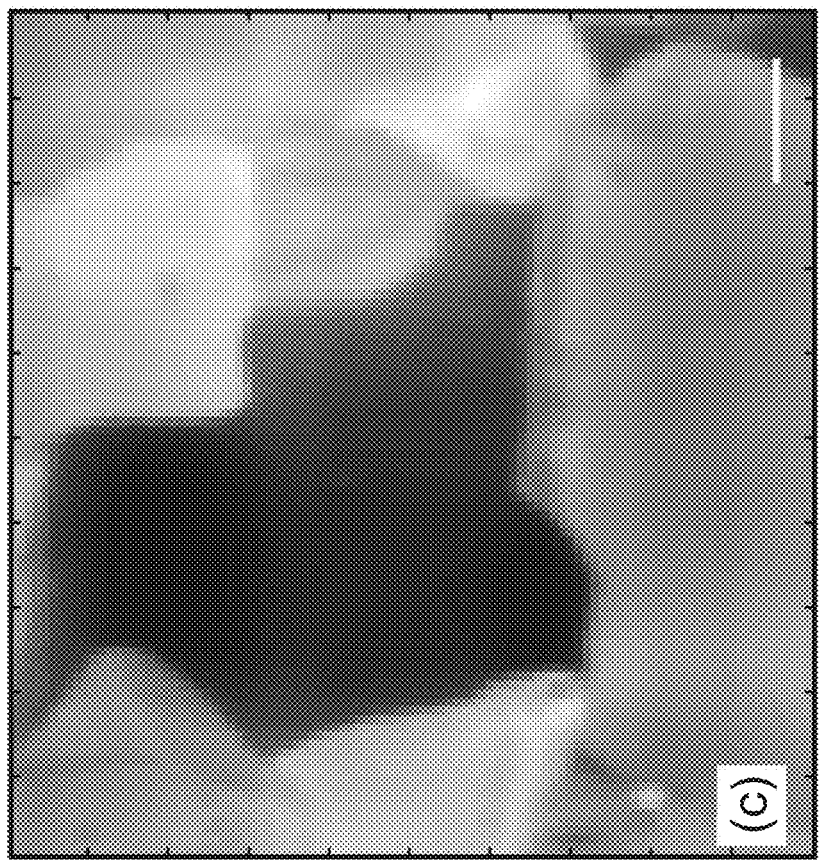

During the F-PTIR measurements, the QCL 104 was modulated by an external function generator at frequencies up to 25 kHz, which corresponds to thermal diffusion length of 1.54 µm. This is comparable to the spatial resolution of optical epi-fluorescence microscope used in the experiment, which can, in principle, resolve features of the samples on the order of 1 µm. Referring to FIGS. 2c and 2d F-PTIR images of R6G-associated silica gel are provided in which epi-fluorescence field-of-view for reference is provided in FIG. 2c and unprocessed F-PTIR image at 20 kHz modulation frequency, corresponding to a thermal diffusion length of 1.72 µm is provided in FIG. 2d. Scale bar is 10 µm.

Figures 3A, 3B:
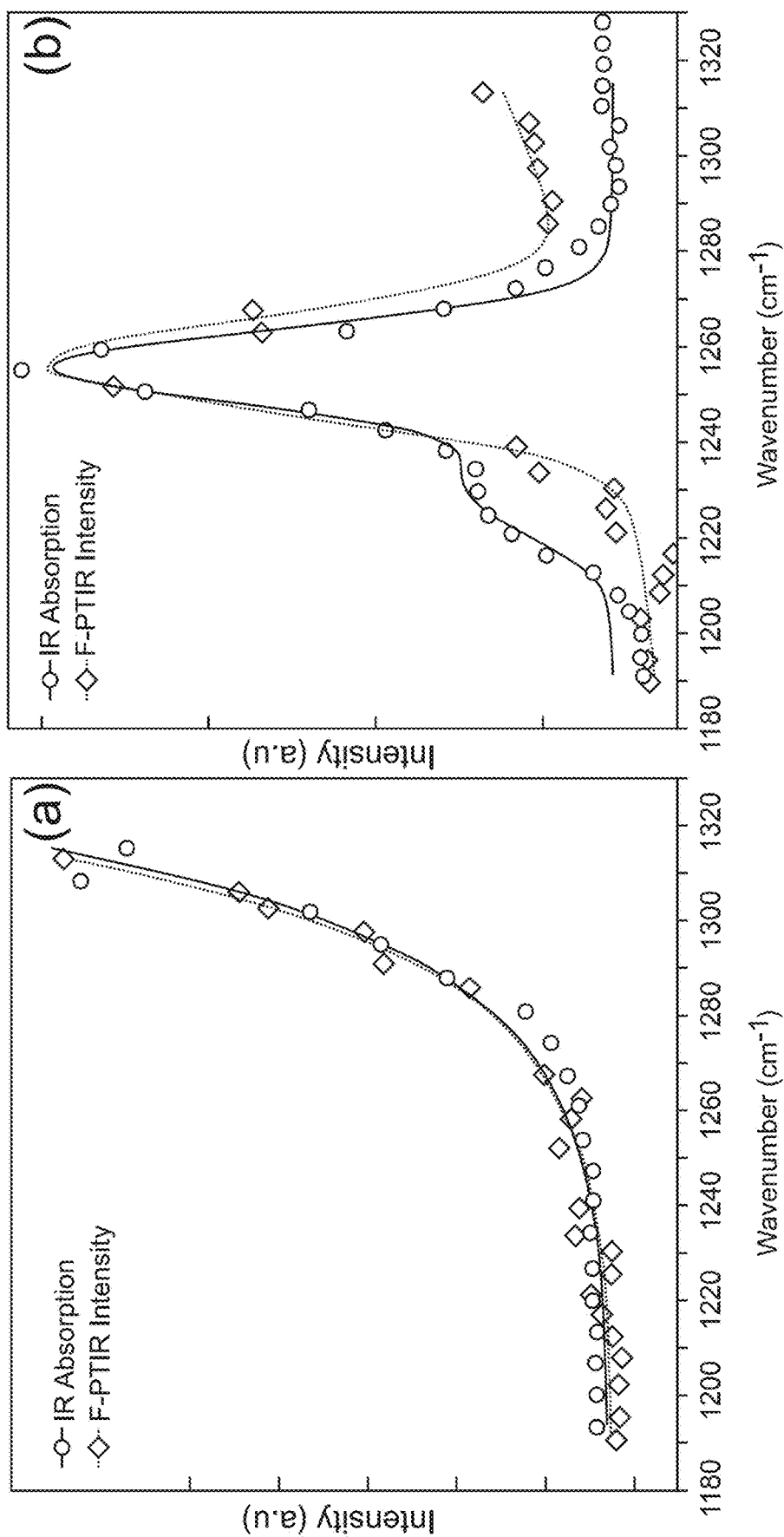
FIGS. 3a and 3b are F-PTIR and Fourier transform infrared (FTIR) spectra for thin liquid films, respectively, which represent graphs of intensity in a.u. vs. wavenumber in $cm^{-1}$, providing comparison between F-PTIR intensity, normalized to QCL channel intensity, and mid-IR absorption spectrum for DMSO (FIG. 3a) and DMF (FIG. 3b) by FTIR.

Prior to implementation in microscopy, F-PTIR and FTIR spectra for thin liquid films were compared, as provided in FIGS. 3a and 3b, which represent graphs of intensity in a.u. vs. wavenumber in cm$^{-1}$, providing comparison between F-PTIR intensity, normalized to QCL channel intensity, and mid-IR absorption spectrum for DMSO (FIG. 3a) and DMF (FIG. 3b) by FTIR. As can be seen in the figure, the F-PTIR spectra were generally in good agreement with absorbance spectra of both DMF and DMSO within the wavelength range accessible by the QCL used in these studies. Deviations between F-PTIR and FTIR for the low-frequency 1227 cm$^{-1}$ shoulder in the DMF spectrum are attributed to low laser power at those frequencies, with corresponding increases in F-PTIR measurement uncertainty.

As discussed above, the work described in US Pub. application Ser. No. 20220018773 for Prater suffers from poor discrimination between materials with similar IR characteristics because of uniqueness of wavelength for each IR emission corresponding to an absorption band within the sample. The present disclosure provides a novel approach to enhance the optical characteristics via use of an IR source supporting random-access rapid-fire delivery of multiple wavelengths to provide a multiplexed signal to noise advantage upon illumination with designed patterns of wavelengths for optimizing contrast. Towards this end, an optical binary masks and non-negative matrix factorization technique is disclosed to enhance ability to discriminate between materials with similar IR characteristics.

Figure 4E:
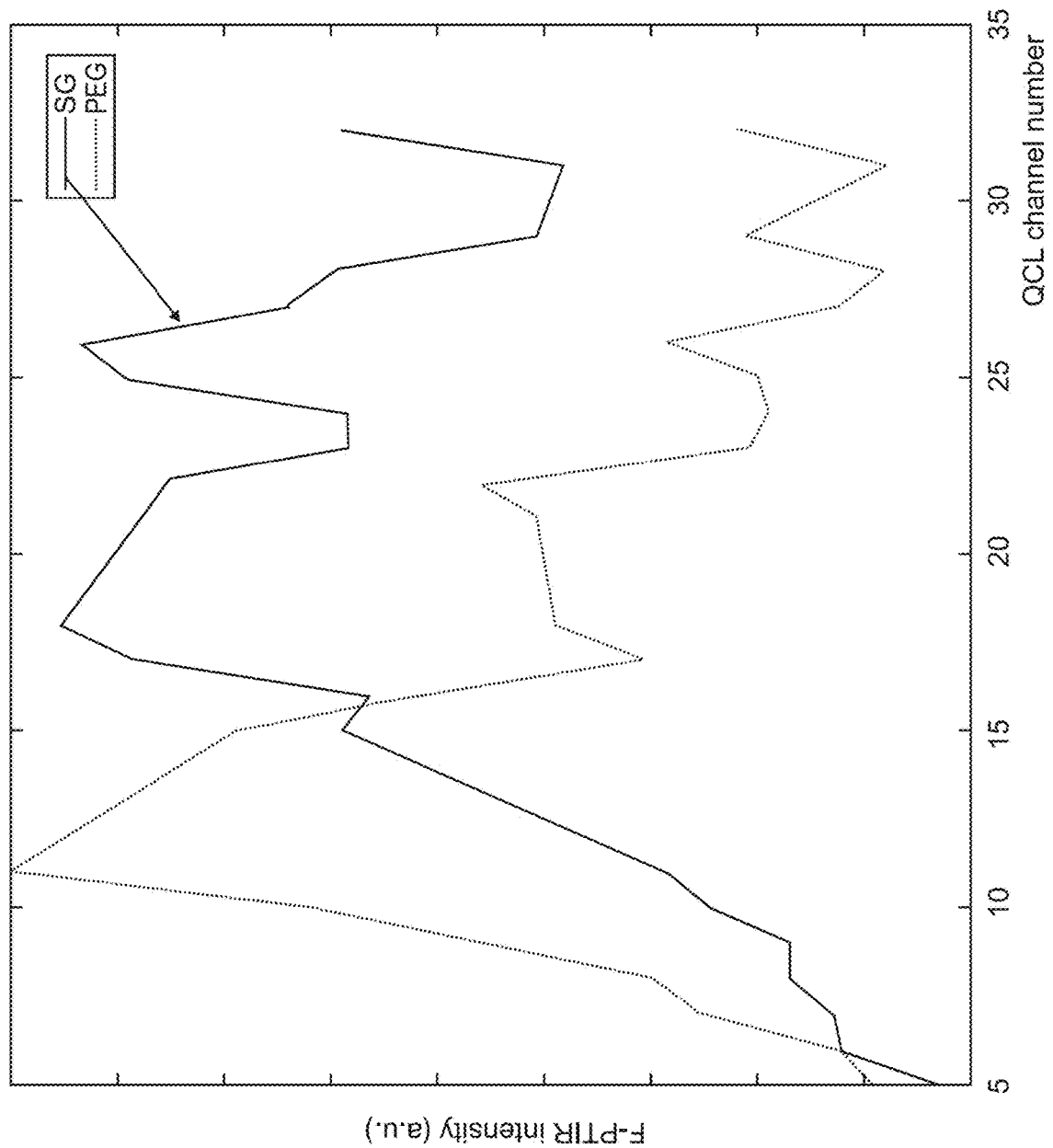

Referring to FIGS. 4a-4c, results of microscopy measurements are provided that spectroscopically discriminate between particles in a mixture of two powdered materials: PEG and hydrated silica gel. From initial measurements of the unprocessed F-PTIR spectra of each of the two isolated materials, a compressive sensing binary wavelength mask was calculated to optimally discriminate between the two particles (see below for a more detailed discussion). Specifically, FIG. 4a provides the result of F-PTIR Microscopy of a mixture of silica gel (SG) and PEG particles for epi-fluorescence image of the field of view (FOV). Following this calculation, F-PTIR microscopy measurements were performed serially using two mask patterns optimized to resolve PEG and silica gel particles. Consistent with these mask designs, images of the concentration maps exhibit little cross-talk and clear identification of the composition of individual particles. Referring to FIGS. 4b, 4c, and 4d similar results as in FIG. 4a are provided for components map within the FOV (FIG. 4b), where red regions (identified) correspond to species identified as SG; blue regions (identified) correspond to PEG; PEG and SG concentration maps after 10 nonnegative matrix factorization (NNMF) iterations are provided in FIGS. 4c and 4d, respectively. Scale bar is 10 µm.

In order to optimally discriminate between two components within their mixture, two binary QCL spectral masks were applied for compressive spectral sensing. The masks were designed to maximize the amplitude difference of unprocessed F-PTIR signal between two species. Unprocessed F-PTIR spectra of silica gel and PEG are shown in FIG. 4c.

Thus, in the prior art the equivalent of the QCL 104 (see FIG. 1A) is firing at a single wavelength that can be tuned with time to collect the full mid-IR spectrum. However, in the novel approach of the present disclosure an array of 32 individual QCLs (for example only, other number of QCLs is well within the ambit of the present disclosure) each with different wavelengths with at least two or more channels are configured to fire simultaneously allowing discrimination between two chemical species by firing only selected QCL channels that will maximize the absorption of a particular component to highlight this component. With this novel approach, the requirement to scan the laser through every individual wavelength to collect the spectrum is eliminated resulting in an improved discrimination between two chemical components with similar IR signatures. Towards this end, a novel algorithm is disclosed herein that analyzes individual IR absorption spectra of the components to generate optimal sequences of QCL spectral channels that are thus fired simultaneously to maximize the signal difference between two components. The algorithm outputs two sequences each particular component of the sample can be highlighted by maximizing its signal (i.e., photothermal signal). Thus, after two measurements, the components are confidently discriminated since data highlighting each of them individually are available. The nature of the novel algorithm is now further described below.

For further refinement, an NNMF approach was used. Each two corresponding pixels from two F-PTIR images can be written as a 2-by-1 matrix D. It should be noted that there is N pixels in an image and, therefore, the total size of the matrix D is 2×N as well as matrix C is 2×N. D can be considered as the matrix product of the abovementioned binary masks M by the matrix of QCL channels F-PTIR intensity in each image H and concentrations of both components C. The product of M and H is constant within one measurement, which is represented by ε.

$$\underset{2\times 1}{D} = \underset{2\times 32}{M} \times \underset{32\times 2}{H} \times \underset{2\times 1}{C} \quad (1)$$

$$\underset{2\times 1}{D} = \underset{2\times 2}{\varepsilon} \cdot \underset{2\times 1}{C} \quad (2)$$

The concentrations of two components can be solved for by carrying out:

$$C = (\varepsilon^T \cdot \varepsilon)^{-1} \cdot \varepsilon^T \cdot D \quad (3)$$

Uncertainty in the measured pure component spectra resulted in recovered values C less than zero, which is mathematically allowed but physically impossible. Refinement in the pure component spectra and corresponding concentration maps were performed by NNMF using the following algorithm:

(1) Replace any negative values in C by 0 to generate new matrix $C_i$, then solve for new $\varepsilon_i$:

$$\varepsilon_i = DC_i^T(C_i C_i^T)^{-1} \quad (4)$$

(2) Replace negative value in $\varepsilon_i$ by 0 to generate new $C_{i+1}$.
(3) Repeat steps 1 and 2 until there is no negative values in $C_{i+1}$.

Figure 5A:
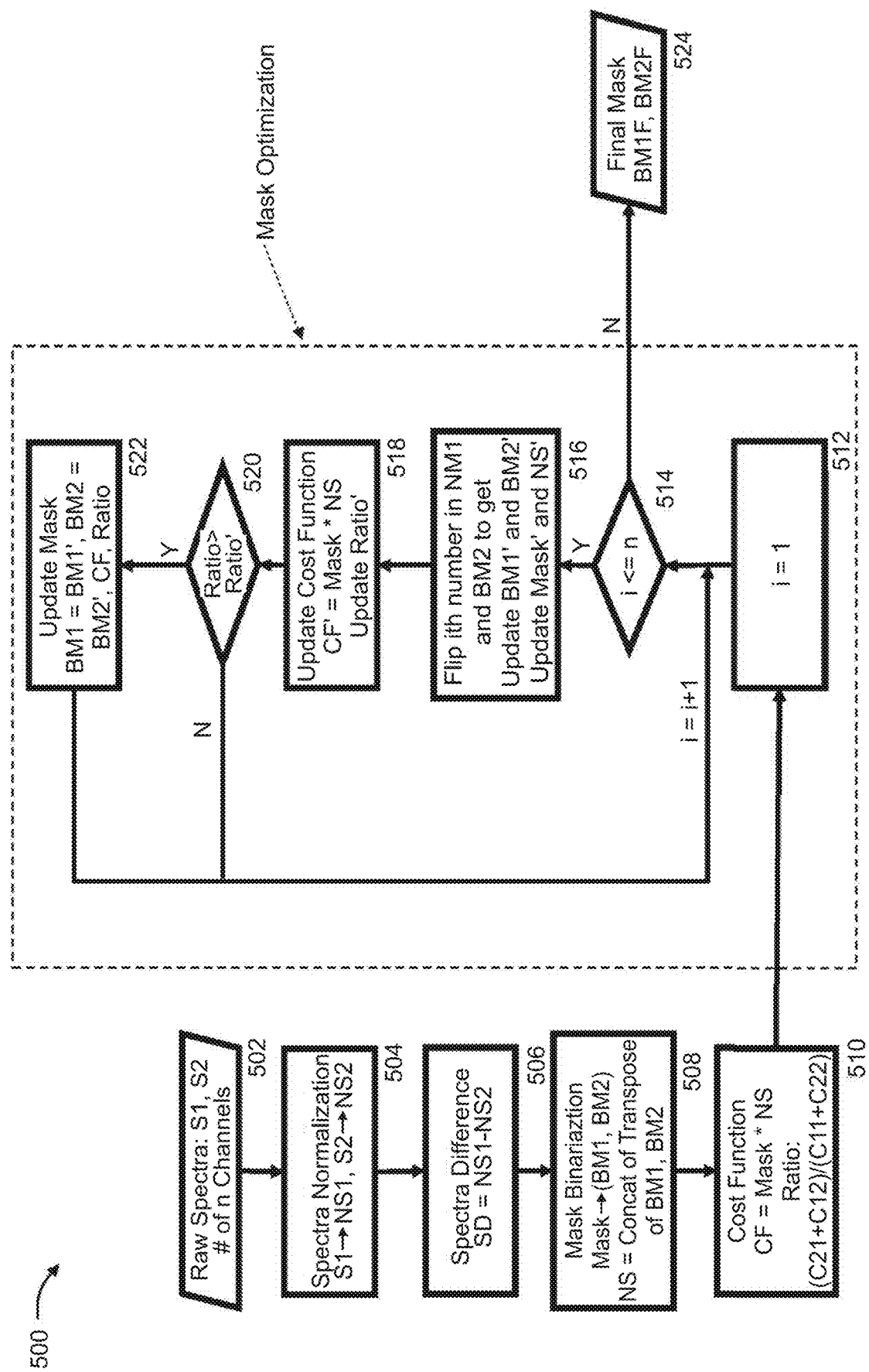
FIG. 5a is a flowchart that depicts the steps taken by a controller configured to carry out an algorithm of the present disclosure in order to discriminate between two components on the sample.

Referring to FIG. 5a a flowchart 500 is provided that depicts the steps taken by a controller configured to carry out the above-described algorithm in order to discriminate between two components on the sample. Generally, the binary masks for QCL channel pattern are generated from the known FTIR or F-PTIR spectra of two species (i.e., two components to be discriminated). Firstly, a MATLAB code reads and normalizes the two spectra for better comparison. Secondly, the difference vector of the two spectra is calculated by (spectrum 1-spectrum 2). Next, a Boolean vector can be generated using the binarization of the difference vector. This Boolean vector is the initial mask for component 1 (BM1) and the reversed Boolean vector is the initial mask for component 2 (BM2). The Boolean values of 1 and 0 corresponding to the on or off conditions of each QCL channel. Then a cost function is defined to maximize the difference in integrated intensity for the two raw spectra and minimize crosstalk. An optimization loop is repeated for the number of channels in the QCL within which each Boolean value in BM1 and BM2 are reversed and fed into the cost function. By comparing the cost function results, the BM1 and BM2 are updated for best discrimination purpose which is used to program the QCL sequence based on two masks to enable modulated mid-IR heating.

Specifically, the algorithm begins by receiving raw mid-IR absorption spectra (e.g., S1 and S2) of mid-IR absorption from the sample in step 502. Next, the controller normalizes the incoming spectra (e.g., NS1, and NS2) in step 504. Next the controller calculates the difference in the normalized spectra (e.g., SD=NS1−NS2) in step 506. Next, the controller uses the difference in the normalized spectra (SD) to generate two complementary masks; the initial mask for component 1 (BM1) and the complementary logically negated Boolean vector.

The initial mask (BM1) is generated by assigning all positive wavelength channels in SD a Boolean value of 1, and all negative values a Boolean value of 0, which is a 1×n matrix, where n represents the number of QCL channels. The complementary mask (BM2) is the complement to BM1, in which all 1 and 0 values are inverted. The Boolean values of 1 and 0 corresponding to the on or off conditions of the each QCL channel. BM2 is another 1×n matrix. The mask is a binary concatenation of BM1 and BM2 which is a 2×n matrix. NS (which is the normalized spectra) is a concatenation of the transpose of NS1 and NS2, the NS is a n×2 matrix, as shown in step 508. Next the controller uses a cost function (CF) for optimization (CF=Mask*NS, which is a matrix multiplication of the Mask and NS resulting in a 2×2 matrix), as shown in step 510. In step 510, the controller also determines a ration of the CF((C21+C12)/(C11+C22)) which is used to determine reduction of the cost function in the optimization loop. Next, the controller using an optimization loop (starting with loop index i=1) in step 512 begins a mask optimization procedure by aiming to reduce the cost function by comparing the aforementioned ratio from each traversal through the loop. In query 514, the controller determines if the loop index has reached the final value (n), where n is again the total number of the QCL operating channels. If the loop index is less that n, the controller inverts the logical values for the i'th entry (i.e., the most significant bit, MSB) in BM1 and BM2 (e.g., if BM1$i$=0 and BM2$i$=1, logical inversion results in BM1'$i$=1 and BM2'$i$=0) to obtain updated BM1' and BM2' as provided in step 516. With the updated BM1' and BM2' the Mask is updated as Mask' along with NS' as updated NS and the cost function is reevaluated as the modified cost function (CF'=Mask'*NS') as shown in step 518. Next the controller determines if the old cost function is less than the modified cost function (i.e., whether CF<CF' by first calculating the modified Ratio' and comparing the old Ratio to the new Ratio') in query 520. If it is, in block 522 the controller updates the masks to the modified masks (i.e., BM1=BM1' and BM2=BM2') and proceeds to increase the loop index (i.e., i=i+1) and proceeds to query 514. If the response to query 520 is in the negative, the controller discards the modified BM1', BM2', NS', CF', and Ratio' and proceeds to increase the loop index (i.e., i=i+1) and then proceeds to query 514. Once the loop index reaches the final number n, then controller outputs the final mask BM1F and BM2F in step 524.

Figure 5C:
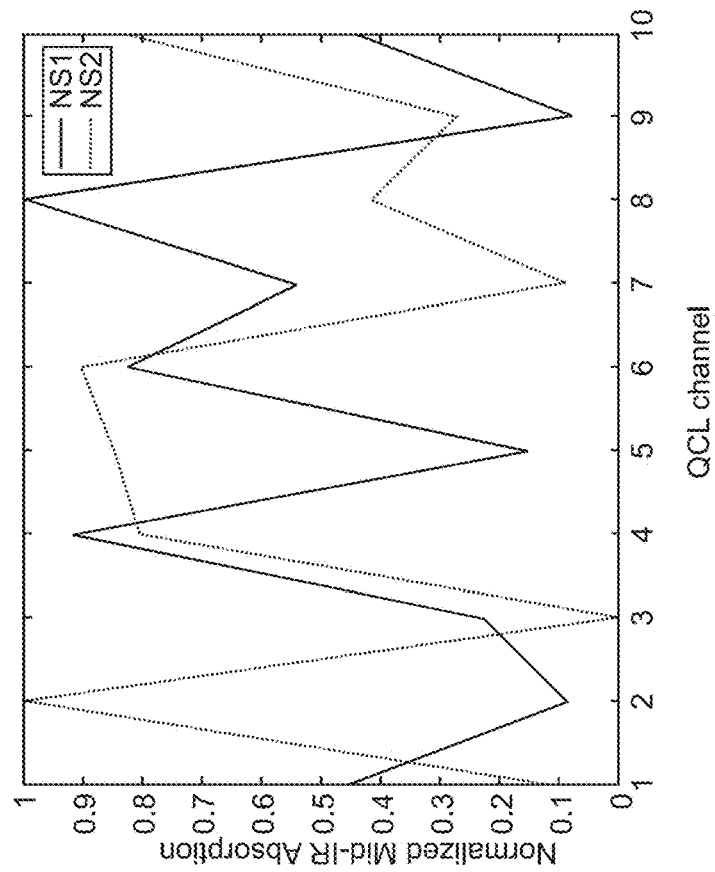
Figure 5B:
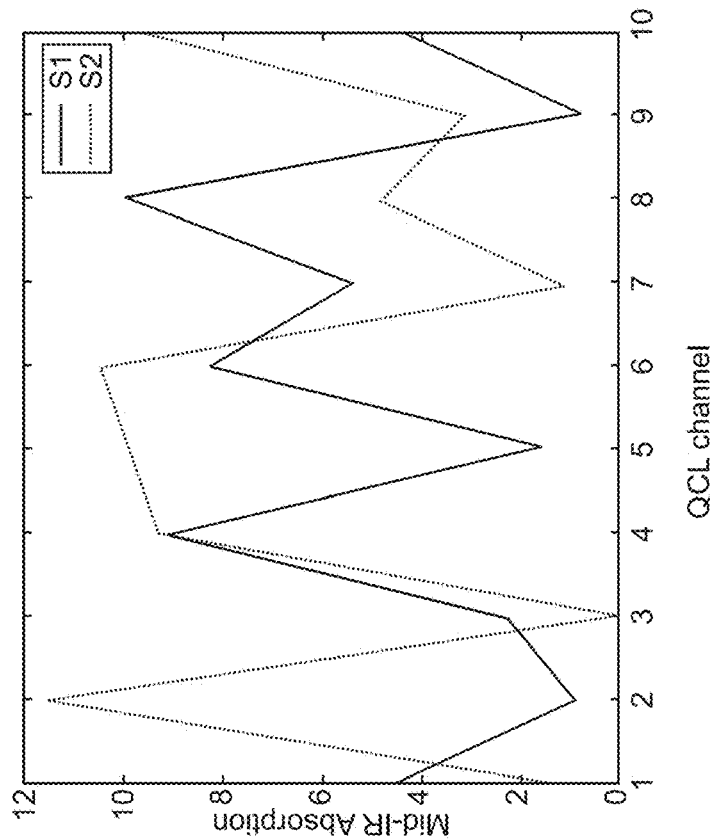

To better elucidate the algorithm shown in FIG. 5a, a shortened non-limiting example is provided. In this non-limiting example, instead of 32 channels, only 10 channels are provided only for simplicity's sake. Suppose the raw mid-IR absorption spectra for the two components of interest are shown in FIG. 5b, where the X-axis represents QCL channel and the Y-axis represents the relative absorption for each of the two components. FIG. 5c represents the normalization of FIG. 5b (whereby NS1=S1/(max (S1)), and NS2=S2/(max (S2)). From FIG. 5c, two matrixes can be established:
  NS1=[0.4523 0.0841 0.2299 0.9169 0.1530 0.8290 0.5404 1.0000 0.0785 0.4444] which is a 1×10 matrix and
  NS2=[0.1109 1.0000 0.0048 0.8056 0.8497 0.9031 0.0878 0.4156 0.2702 0.8318] which is another 1×10 matrix.

The different spectra (SD) is
  SD=[0.3414-0.9159 0.2251 0.1113-0.6967-0.0741 0.4526 0.5844-0.1917-0.3874]

Figure 5D:
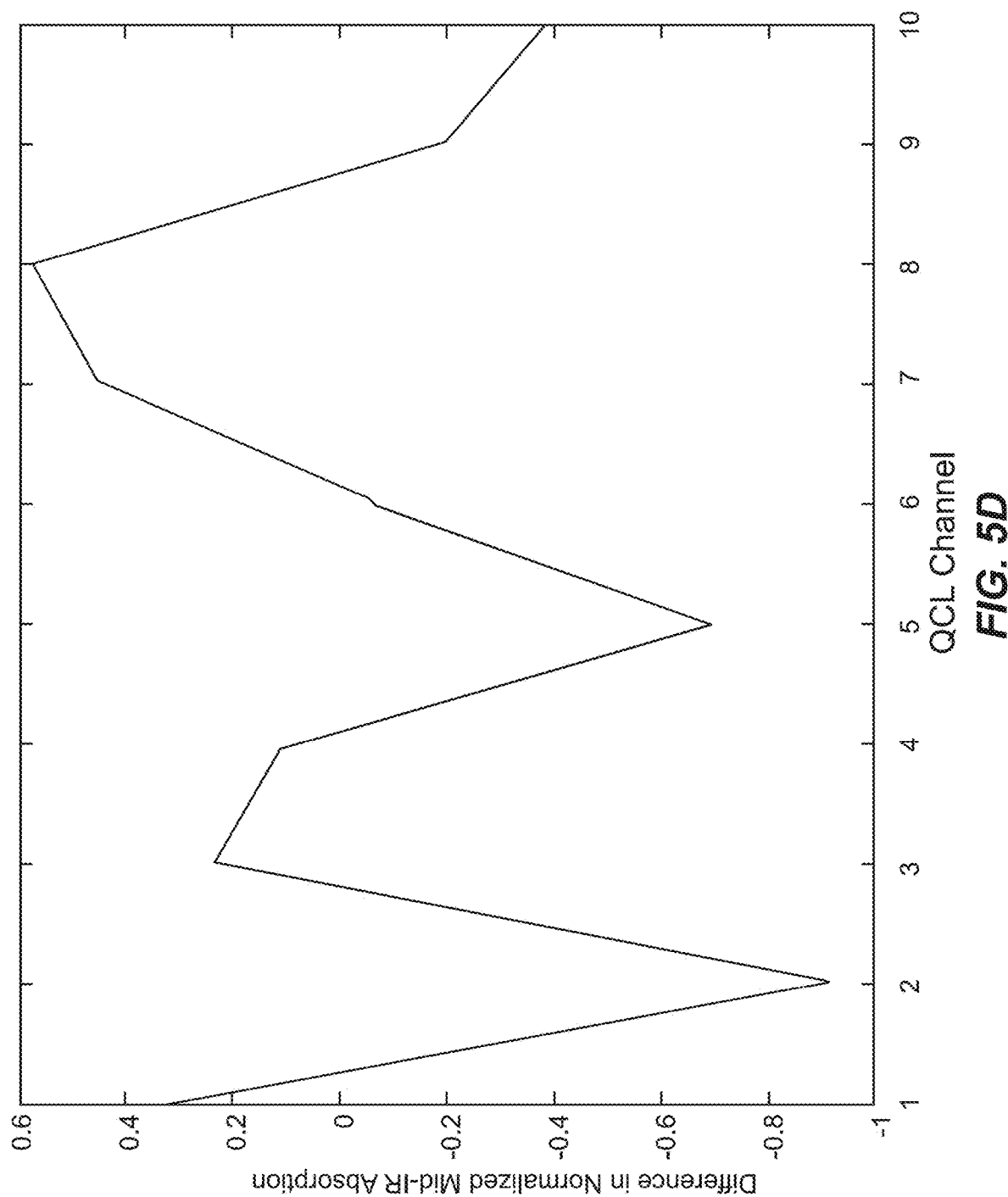

The SD is plotted in FIG. 5d. From the difference of normalized mid-IR absorption (i.e., Y-axis in FIG. 5d), the two masks BM1 and BM2 are established. For example, the first element (i.e., at QCL channel 1) is 0.3414 which is a positive number, resulting in BM1 first value to be 1. The next SD value is −0.9159 which is a negative value, resulting in the second value of BM1 to be 0, and so. BM2 is simply the complement of BM1. Thus,
  BM1=[1 0 1 1 0 0 1 1 0 0] which is a 1×10 matrix and
  BM2=[0 1 0 0 1 1 0 0 1 1] which is also a 1×10 matrix.
  The combined mask is then $$\text{Mask} = [1\ 0\ 1\ 1\ 0\ 0\ 1\ 1\ 0\ 0$$
$$0\ 1\ 0\ 0\ 1\ 1\ 0\ 0\ 1\ 1]$$

which is a 2×10 matrix. The normalized spectra is then built as a 10×2 matrix:

$$NS = [0.4523\ 0.1109$$
$$0.0841\ 1.0000$$
$$0.2299\ 0.0048$$
$$0.9169\ 0.8056$$
$$0.1530\ 0.8497$$
$$0.8290\ 0.9031$$
$$1.5404\ 0.0878$$
$$1.0000\ 0.4156$$
$$0.0785\ 0.2702$$
$$0.4444\ 0.8318]$$

which represent transpose of NS1 and NS2 concatenated. The cost function is thus defined as the matrix multiplication of Mask by the NS (i.e., Mask×NS) which is a 2×2 matrix.

$$\text{Cost} = \text{Mask} \times NS = [3.1395\ 1.4247\ 1.5886\ 3.8548],$$

a 2×2 matrix.

A ratio is defined as (C12+C21)/(C11+C22) which is minimized by passing through the optimization loop shown in FIG. 5a. In the first pass through the loop, this ratio is (1.4247+1.5886)/(3.1395+3.8548). This Ratio is 0.4308. This minimization is carried out by the operation described in the optimization loop of FIG. 5a. First, each binary mask (BM1 and BM2) is modified (BM1' and BM2') by flipping the most significant bit (MSB) of each binary mask. Thus the new masks are:
  BM1'=[0 0 1 1 0 0 1 1 0 0] where the MSB is flipped, and
  BM2'=[1 1 0 0 1 1 0 0 1 1] where the MSB is flipped. The combined mask is then $$\text{Mask}' = [0\ 0\ 1\ 1\ 0\ 0\ 1\ 1\ 0\ 0$$
$$1\ 1\ 0\ 0\ 1\ 1\ 0\ 0\ 1\ 1].$$

The new cost function is then determined based on the matrix multiplication (2×10 Mask' matrix by 10×2 NS') which yields the modified ratio Ratio'=(C12'+C21')/(C11'+C22'). The modified Ratio' is (1.3138+2.0409)/(2.6872+3.9657) which is 0.5042. Since Ratio'>Ratio, the masks will remain unchanged and as a result BM1' and BM2' are discarded. If however, Ratio>Ratio', then the masks would be updated, i.e., BM1=BM1' and BM2=BM2' as well as the Ratio=Ratio'. Next iteration of the loop then flips the next bit from the MSB. That is:
  BM1=[1 1 1 1 0 0 1 1 0 0], and
  BM2=[0 0 0 0 1 1 0 0 1 1]. Note that in the first iteration, the binary masks (BM1 and BM2) were not updated since Ratio'>Ratio. The loop continues in this manner until the loop index completes the $n^{th}$ iteration to yield the final masks which are then used to operate the QCL. The final masks inform which QCL channel should be turned on. Thus, suppose the final masks (i.e., BM1F and BM2F) are:
  BM1=[1 1 1 1 0 0 1 1 0 0], and BM2=[0 0 0 0 1 1 0 0 1 1], in the 10 channel example thus far discussed.

These two masks result in two measurements. In the first measurement channels 1, 2, 3, 4, 7, 8 are turned on while channels 5, 6, 9, and 10 are left off. In the second measurement channels 5, 6, 9, and 10 turned on while channels 1, 2, 3, 4, 7, and 8 are left off. Each QCL channel is associated with a corresponding wavelength. Thus, by knowing which channel to turn on concurrently the two components are energized simultaneously. In addition to selectively activating the QCL channels based on the finalized masks, the power within each channel can also be modulated for additional fine-tuning between energization of the two components.

The MATLAB code is provided as an Appendix to the present disclosure as both evidence of actual reduction to practice of at least one embodiment as well as to enable a person having ordinary skill in the art to practice the claims of the present disclosure without undue experimentation.

Figure 6B:
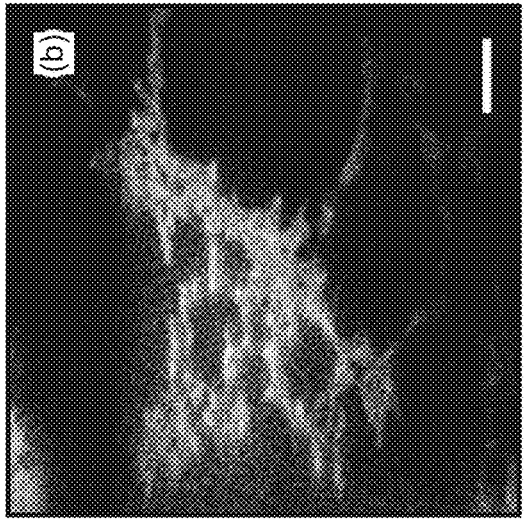
FIG. 6b is similar to FIG. 6a but which provides a label-free two-photon excited ultraviolet fluorescence (TPE-UVF) images of phase-separated film.
Figure 6A:
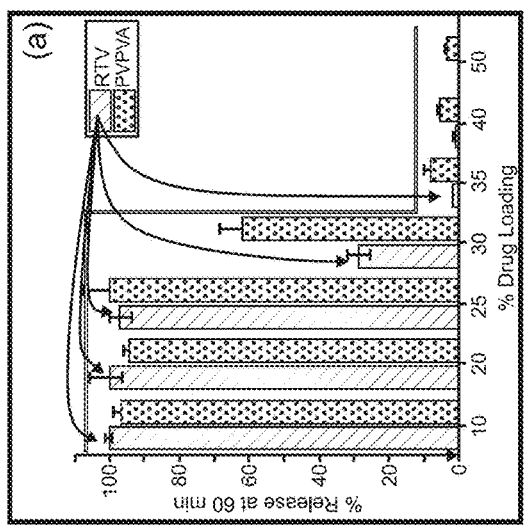
FIG. 6a is an F-PTIR microscopy output of amorphous phase separated ritonavir (RTV)-Polyvinylpyrrolidone/vinyl acetate (PVPVA) samples including an Illustration of the "dropping off the cliff" release phenomenon for RTV-PVPVA system.

Building on the results of these proof-of-concept studies with known materials, F-PTIR images of amorphous solid dispersions of ritonavir in PVPVA were acquired to explore the possible generation of amorphous phase-separated ritonavir-rich domains. Amorphous solid dispersions are widely used to address low aqueous solubility limitations of many active pharmaceutical ingredients (APIs) by dispersing the API within a polymer with established dissolution properties. In typical use-cases, dissolution of the polymer results in release of the API according to kinetics dictated by the polymer rather than the solid-state form of the API. However, prior studies of numerous ASD formulations have reported a "dropping off a cliff" phenomenon, shown in FIG. 6a, in which API-loadings higher than a critical threshold result in abrupt reductions in the rate or extent of API dissolution. Specifically, FIG. 6a provides F-PTIR microscopy of amorphous phase separated ritonavir-PVPVA samples including an Illustration of the "dropping off the cliff" release phenomenon for RTV-PVPVA system.

Figure 6D:
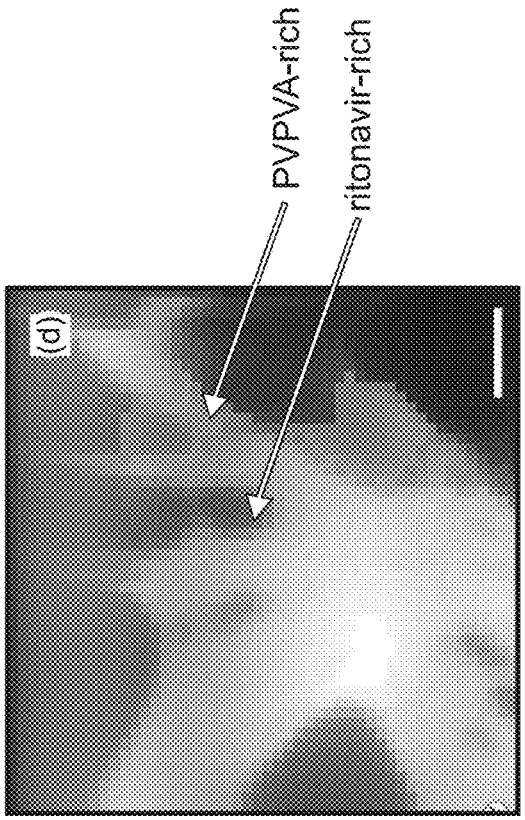
FIGS. 6c and 6d are F-PTIR microscopy outputs of amorphous phase separated RTV-PVPVA samples for epi-fluorescence image of the field-of-view used for F-PTIR measurements, with Nile Red partitioning to the bright domains (FIG. 6c) and classification of ritonavir-rich (blue, identified) and PVPVA-rich (red, identified) domains based on F-PTIR results.
Figure 6C:
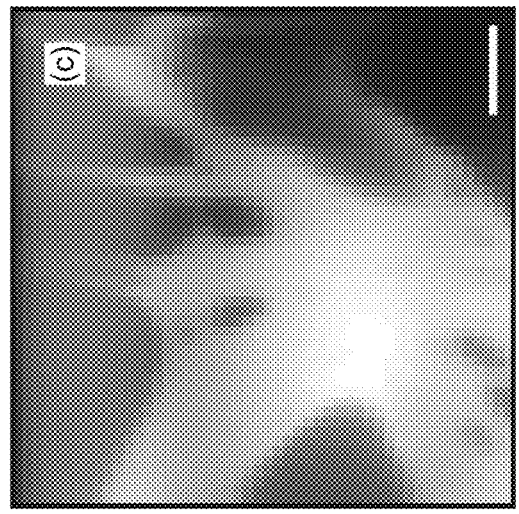

This reduction is a consequence of phase separation and the formation of API-rich domains of low aqueous solubility. Building on our prior work, spin-case films of ritonavir in PVPVA with trace (0.1%) Nile red added as a fluorescence reporter were exposed to high humidity for 1 hour to induce phase-separation, then measured F-PTIR to determine composition within the phase-separated domains. The bright field, fluorescence, and F-PTIR microscopy measurements were performed, shown in FIGS. 6c and 6d which provide F-PTIR microscopy outputs of amorphous phase separated ritonavir-PVPVA samples for epi-fluorescence image of the field-of-view used for F-PTIR measurements, with Nile Red partitioning to the bright domains (FIG. 6c) and classification of ritonavir-rich (blue, identified) and PVPVA-rich (red, identified) domains based on F-PTIR results. The image was segmented into 27 "superpixels" and each of them was assigned to either one of the components or background (scale bar is 15 μm). From the results of the F-PTIR measurements, phase-separated domains exhibit clear enrichment in ritonavir based on the mid-infrared spectroscopy. To further corroborate the F-PTIR measurements and to assess the possible perturbation by the fluorescent marker, complementary label-free measurements of ritonavir/PVPVA mixtures were recorded by two-photon excited ultraviolet fluorescence (TPE-UVF) images, shown in FIG. 6b, which similar to FIG. 6a provides a label-free TPE-UVF images of phase-separated film. (Scale bar is 100 μm). TPE-UVF leverages the weak but nonzero autofluorescence of ritonavir as an image contrast agent. Comparisons of FIGS. 6b and 5d indicate clear structural similarities between the phase-separated domains corresponding to ritonavir as identified by F-PTIR spectroscopy with those producing native TPE-UVF in the absence of a fluorescent marker.

The demonstration of F-PTIR herein provides a basis to couple a diverse suite of fluorescence-based sensing strategies for signal transduction of mid-infrared absorption. Most directly, fluorescence provides specificity to labeled structures interrogated by IR absorption through F-PTIR; the fluorophore must reside within the thermal plume of the IR absorber in order to register a photothermal perturbation. The higher sensitivity of F-PTIR relative to O-PTIR suggests potential greater case of integration into wide-field PTIR microscopy measurements. Furthermore, super-localization of fluorescence through STORM/PALM approaches can routinely yield spatial resolution on the order of 10's of nm in bulk media, suggesting potential promise for performing infrared spectroscopy by F-PTIR localized in 3D at comparable spatial resolution.

Those having ordinary skill in the art will recognize that numerous modifications can be made to the specific implementations described above. The implementations should not be limited to the particular limitations described. Other implementations may be possible.

The invention claimed is:

1. A method of selectively photothermally heating a sample in a fluorescence-detected mid-infrared photothermal microscopy in order to discriminate between two components in the sample, comprising:
    energizing a sample with one or more modulated infrared (IR) beams sourced by a multichannel laser array;
    concurrently continuously illuminating the sample with a probe beam, thereby generating a fluorescence response signal, whereby the multichannel laser output is modulated thereby modulating the heating at a predetermined frequency, thereby modulating the fluorescence response signal;
    capturing the fluorescence response signal;
    processing the captured modulated fluorescence response signal into two IR absorption spectra corresponding to chemical properties of two components in the sample by scanning over each channel of the multichannel laser array;
    generating a binary mask associated with the two spectra;
    establishing a cost function based on the generated binary mask;
    optimizing the cost function by optimizing the binary mask; and
    selectively energizing channels of the multichannel laser array based on the optimized binary mask thereby maximizing discrimination between the two components.

2. The method of claim 1, wherein each channel of the multichannel laser array is associated with a unique wavelength.

3. The method of claim 1, wherein the sample is capable of autofluorescence.

4. The method of claim 1, wherein the sample includes one or more fluorescence labels.

5. The method of claim 1, wherein the binary mask is a concatenation of a first primary mask and a second primary mask corresponding to the two IR absorption spectra.

6. The method of claim 5, wherein the first primary mask and the second primary mask are expressed by a 1×n matrix, where the first primary mask is the binary complement of the second primary mask, and where n is number of channels of the multichannel laser array, wherein the binary mask is thus expressed by a 2×n matrix.

7. The method of claim 6, wherein the first primary mask is corresponding to a difference of normalized spectra of the two IR absorption spectra.

8. The method of claim 7, wherein the normalization of each spectrum of the two IR absorption spectra is based on dividing absorption in each spectrum by the maximum absorption value in the associated spectrum.

9. The method of claim 8, wherein each of the normalized spectra is expressed as a n×1 matrix.

10. The method of claim 9, wherein the cost function is based on a matrix multiplication of the binary mask with a concatenated normalized spectra matrix, wherein the concatenated normalized spectra matrix is a concatenation of the two normalized spectra matrixes, wherein the concatenated normalized spectra matrix is expressed as a 2×n matrix, wherein the cost function is thus expressed as a 2×2 matrix.

11. The method of claim 10, wherein the optimization of the cost function is based on iterative minimization of a ratio of addition of diagonal components of the cost function matrix, where the iteration includes n runs through a loop, wherein in each loop run (i) the $i^{th}$ bit of each of the first and the second primary masks are temporarily flipped and the ratio of addition of diagonal components are temporarily calculated, and wherein if the temporary ratio of addition of diagonal components is less than the ratio of addition of diagonal components associated with a prior run of the loop, then temporary first and the second primary masks are assigned as first and the second primary masks and the temporary value of the ratio of addition of diagonal components is assigned as the ratio of addition of diagonal components.

12. The method of claim 11, wherein the optimized cost function generates a first finalized mask and a second finalized mask, each of the first finalized mask and the second finalized mask provide patterns for a first and second activation of the multichannel laser array, correspondingly.

13. A fluorescence-detected mid-infrared photothermal microscopy system capable of discriminating between two components in a sample, comprising:
  a multichannel laser array configured to energize a sample with one or more modulated infrared (IR) beams;
  a continuous laser source configured to provide concurrent and continuous illumination of the sample with a probe beam, thereby generating a fluorescence response signal, whereby the multichannel laser output is modulated thereby modulating the heating at a predetermined frequency, thereby modulating the fluorescence response signal;
  a photomultiplier tube configured to capture the fluorescence response signal; and
  a controller configured to:
    process the captured modulated fluorescence response signal into two IR absorption spectra corresponding to chemical properties of two components in the sample by scanning over each channel of the multichannel laser array;
    generate a binary mask associated with the two spectra;
    establish a cost function based on the generated binary mask;
    optimize the cost function by optimizing the binary mask; and
    selectively energize channels of the multichannel laser array based on the optimized binary mask thereby maximizing discrimination between the two components.

14. The system of claim 13, wherein each channel of the multichannel laser array is associated with a unique wavelength.

15. The system of claim 13, wherein the sample is capable of autofluorescence.

16. The system of claim 13, wherein the sample includes one or more fluorescence labels.

17. The system of claim 13, wherein the binary mask is a concatenation of a first primary mask and a second primary mask corresponding to the two IR absorption spectra.

18. The system of claim 17, wherein the first primary mask and the second primary mask are expressed by a 1×n matrix, where the first primary mask is the binary complement of the second primary mask, and where n is number of channels of the multichannel laser array, wherein the binary mask is thus expressed by a 2×n matrix.

19. The system of claim 18, wherein the first primary mask is corresponding to a difference of normalized spectra of the two IR absorption spectra.

20. The system of claim 19, wherein the normalization of each spectrum of the two IR absorption spectra is based on dividing absorption in each spectrum by the maximum absorption value in the associated spectrum.

21. The system of claim 20, wherein each of the normalized spectra is expressed as a n×1 matrix.

22. The system of claim 21, wherein the cost function is based on a matrix multiplication of the binary mask with a concatenated normalized spectra matrix, wherein the concatenated normalized spectra matrix is a concatenation of the two normalized spectra matrixes, wherein the concatenated normalized spectra matrix is expressed as a 2×n matrix, wherein the cost function is thus expressed as a 2×2 matrix.

23. The system of claim 22, wherein the optimization of the cost function is based on iterative minimization of a ratio of addition of diagonal components of the cost function matrix, where the iteration includes n runs through a loop, wherein in each loop run (i) the $i^{th}$ bit of each of the first and the second primary masks are temporarily flipped and the ratio of addition of diagonal components are temporarily calculated, and wherein if the temporary ratio of addition of diagonal components is less than the ratio of addition of diagonal components associated with a prior run of the loop, then temporary first and the second primary masks are assigned as first and the second primary masks and the temporary value of the ratio of addition of diagonal components is assigned as the ratio of addition of diagonal components.

24. The system of claim 23, wherein the optimized cost function generates a first finalized mask and a second finalized mask, each of the first finalized mask and the second finalized mask provide patterns for a first and second activation of the multichannel laser array, correspondingly.

* * * * *